(12) United States Patent
Im et al.

(10) Patent No.: US 10,691,717 B2
(45) Date of Patent: Jun. 23, 2020

(54) METHOD AND APPARATUS FOR MANAGING DATA

(71) Applicant: Samsung Electronics Co., Ltd., Gyeonggi-do (KR)

(72) Inventors: Young-Gyun Im, Seoul (KR); Young-Tae Jin, Gyeonggi-do (KR); Jae-Bong Chun, Gyeonggi-do (KR); Woo-Kwang Lee, Gyeonggi-do (KR); Chan-Ho Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 325 days.

(21) Appl. No.: 14/749,937

(22) Filed: Jun. 25, 2015

(65) Prior Publication Data

US 2015/0379098 A1 Dec. 31, 2015

(30) Foreign Application Priority Data

Jun. 27, 2014 (KR) .................. 10-2014-0079746

(51) Int. Cl.
*G06F 16/26* (2019.01)
*G06F 16/23* (2019.01)
*G06F 16/48* (2019.01)

(52) U.S. Cl.
CPC .............. *G06F 16/26* (2019.01); *G06F 16/23* (2019.01); *G06F 16/48* (2019.01)

(58) Field of Classification Search
CPC .. G06F 17/30038; G06F 17/30; G06F 17/274; G06F 17/33; G06F 17/30268; G06F 17/30265; G06F 17/30572; G06F 17/30345; G06F 17/30011; G06F 17/30241; G06F 3/14; G06F 3/167; G06F 3/0482; G06F 16/26; G06F 16/23; G06F 16/48; G10L 21/06; G10L 15/22; G06Q 10/10; G06Q 30/02; H04M 1/2745; H04M 3/5175; H04L 63/10; H04N 5/14; H04W 4/008

(Continued)

(56) References Cited

U.S. PATENT DOCUMENTS 5,905,981 A 5/1999 Lawler
5,926,605 A * 7/1999 Ichimura ................ H04N 5/781
                                            360/72.1

(Continued)

FOREIGN PATENT DOCUMENTS

CN 101764990 A 6/2010
CN 103309925 A 9/2013

(Continued)

OTHER PUBLICATIONS

European Search Report dated Nov. 25, 2016.

(Continued)

*Primary Examiner* — Jay A Morrison
*Assistant Examiner* — Antonio J Caiado
(74) *Attorney, Agent, or Firm* — Cha & Reiter, LLC.

(57) ABSTRACT

A method is provided for managing data in an electronic device, the method including: detecting a request for tagging a data record; selecting a portion of the data record in response to the request; identifying a content item based on the selected portion of the data record; and associating the content item with the data record.

13 Claims, 17 Drawing Sheets

(58) Field of Classification Search
USPC .... 707/1, 3–6, 531, 741, 758, 749, E17.123; 704/9, 275, 246, 270, E21.019, E17.001; 379/265.06, 88.14, 265.02; 348/699, 348/E05.062; 345/158; 715/201, 810, 715/780

See application file for complete search history.

(56) References Cited

U.S. PATENT DOCUMENTS

| | | | | |
|---|---|---|---|---|
| 5,995,936 | A * | 11/1999 | Brais | G02B 27/017 369/25.01 |
| 8,201,074 | B2 | 6/2012 | Toyama et al. | |
| 8,532,675 | B1 * | 9/2013 | Pasquero | H04M 1/72572 345/158 |
| 9,009,592 | B2 * | 4/2015 | Friend | G06F 3/167 715/256 |
| 9,489,457 | B2 * | 11/2016 | Regan | G06F 9/445 |
| 2004/0062364 | A1 | 4/2004 | Dezonno et al. | |
| 2005/0043947 | A1 * | 2/2005 | Roth | G10L 15/19 704/236 |
| 2005/0243783 | A1 | 11/2005 | Lee et al. | |
| 2006/0067507 | A1 | 3/2006 | Erhart et al. | |
| 2007/0022867 | A1 * | 2/2007 | Yamashita | G10H 1/368 84/612 |
| 2007/0136680 | A1 | 6/2007 | Skrenta | |
| 2007/0239537 | A1 * | 10/2007 | Protheroe | G06Q 30/02 705/14.54 |
| 2008/0019569 | A1 * | 1/2008 | Rhoads | G06F 3/017 382/107 |
| 2008/0057922 | A1 * | 3/2008 | Kokes | G06F 17/30026 455/414.1 |
| 2008/0194270 | A1 * | 8/2008 | Greenberg | G06Q 10/10 455/456.1 |
| 2009/0234655 | A1 * | 9/2009 | Kwon | 704/270.1 |
| 2010/0009722 | A1 | 1/2010 | Levy et al. | |
| 2010/0062811 | A1 * | 3/2010 | Park | G06F 3/0482 455/566 |
| 2010/0088582 | A1 | 4/2010 | Toyama et al. | |
| 2010/0216441 | A1 * | 8/2010 | Larsson | G06F 17/3028 455/415 |
| 2011/0022661 | A1 * | 1/2011 | Alsina | G06Q 10/109 709/205 |
| 2011/0054647 | A1 * | 3/2011 | Chipchase | H04M 3/42127 700/94 |
| 2011/0066941 | A1 * | 3/2011 | Chipchase | G06F 3/167 715/716 |
| 2011/0083073 | A1 * | 4/2011 | Atkins | H04N 21/4147 715/704 |
| 2011/0154197 | A1 * | 6/2011 | Hawthorne | G06F 17/3002 715/704 |
| 2011/0304770 | A1 | 12/2011 | Kubota | |
| 2011/0304774 | A1 | 12/2011 | Latta et al. | |
| 2012/0020522 | A1 * | 1/2012 | Soderstrom | G06F 17/30241 382/103 |
| 2012/0035925 | A1 * | 2/2012 | Friend | G06F 3/167 704/235 |
| 2012/0069131 | A1 * | 3/2012 | Abelow | G06Q 10/067 348/14.01 |
| 2012/0098998 | A1 * | 4/2012 | Lee | H04N 5/772 348/231.4 |
| 2012/0199645 | A1 * | 8/2012 | Rothschild | G06Q 20/10 235/375 |
| 2012/0253795 | A1 * | 10/2012 | Andrews | H04W 4/021 704/201 |
| 2012/0323575 | A1 | 12/2012 | Gibbon et al. | |
| 2013/0014137 | A1 * | 1/2013 | Bhatia | H04N 21/252 725/9 |
| 2013/0018659 | A1 * | 1/2013 | Chi | G06F 17/30401 704/275 |
| 2013/0024882 | A1 * | 1/2013 | Lee | G06Q 30/0207 725/23 |
| 2013/0124984 | A1 * | 5/2013 | Kuspa | H04N 9/475 715/255 |
| 2013/0132964 | A1 * | 5/2013 | Kim | G06F 17/30997 718/103 |
| 2013/0151545 | A1 * | 6/2013 | Naaman | G06F 17/30241 707/759 |
| 2013/0241834 | A1 * | 9/2013 | Vennelakanti | G06F 3/017 345/158 |
| 2013/0246419 | A1 | 9/2013 | Kwak et al. | |
| 2013/0297308 | A1 * | 11/2013 | Koo | G06F 3/167 704/235 |
| 2013/0311186 | A1 * | 11/2013 | Lee | G10L 15/26 704/260 |
| 2014/0006027 | A1 * | 1/2014 | Kim | G10L 15/22 704/246 |
| 2014/0032550 | A1 * | 1/2014 | Park | G06F 17/30265 707/736 |
| 2014/0047386 | A1 | 2/2014 | Lynch et al. | |
| 2014/0063317 | A1 * | 3/2014 | Jung | H04N 5/23293 348/333.02 |
| 2014/0122513 | A1 | 5/2014 | Julia et al. | |
| 2014/0140497 | A1 | 5/2014 | Ripa et al. | |
| 2014/0196084 | A1 * | 7/2014 | Aaron | H04N 21/233 725/34 |
| 2014/0215505 | A1 * | 7/2014 | Balasubramanian | H04N 21/4722 725/13 |
| 2014/0222432 | A1 * | 8/2014 | Ahn | G10L 15/1822 704/257 |
| 2014/0232745 | A1 * | 8/2014 | Cho | H04M 1/72544 345/632 |
| 2014/0304596 | A1 * | 10/2014 | Chandran | G06Q 50/01 715/704 |
| 2014/0365884 | A1 * | 12/2014 | Kara | G06F 3/167 715/704 |
| 2014/0380420 | A1 * | 12/2014 | Wang | G06Q 10/10 726/4 |
| 2015/0019969 | A1 * | 1/2015 | Lee | G06F 3/04842 715/719 |
| 2015/0039646 | A1 * | 2/2015 | Sharifi | H04N 21/4394 707/769 |
| 2015/0046483 | A1 * | 2/2015 | Liu | G06K 9/6215 707/758 |
| 2015/0287409 | A1 * | 10/2015 | Jang | G10L 15/26 704/235 |
| 2016/0007083 | A1 * | 1/2016 | Gurha | H04N 21/44222 725/13 |
| 2017/0161268 | A1 * | 6/2017 | Badaskar | G06F 17/3005 |

FOREIGN PATENT DOCUMENTS

| | | |
|---|---|---|
| CN | 103428539 A | 12/2013 |
| EP | 1 583 333 A2 | 10/2005 |
| KR | 10-2005-0087312 A | 8/2005 |
| KR | 10-2006-0051816 A | 5/2006 |
| KR | 10-2006-0083240 A | 7/2006 |
| KR | 10-2008-0083553 A | 9/2008 |
| KR | 10-2009-0099306 A | 9/2009 |
| KR | 10-2012-0088493 A | 8/2012 |

OTHER PUBLICATIONS

European Search Report, dated Jun. 16, 2017.
Dhiraj Joshi et al.; "The Story Picturing Engine", Finding Elite Images to Illustrate a Story Using Mutual Reinforcement, pp. 119-126.
European Search Report dated Jan. 29, 2018.
Chinese Search Report dated Sep. 4, 2019.
Chinese Search Report dated May 12, 2020.

* cited by examiner

METHOD AND APPARATUS FOR MANAGING DATA

CLAIM OF PRIORITY

This application claims the benefit under 35 U.S.C. § 119(a) of a Korean patent application filed in the Korean Intellectual Property Office on Jun. 27, 2014 and assigned Serial No. 10-2014-0079746, the entire disclosure of which is hereby incorporated by reference.

BACKGROUND

1. Field of the Disclosure

The present disclosure relates to electronic devices and more particularly, to a method and apparatus for managing data.

2. Description of the Related Art

Electronic devices for performing one or more functions in combination have been increased in number in recent years. Further, a mobile terminal which is represented as so-called a 'smartphone' is mainly used as the electronic devices. The mobile terminal has a touch-type display module with a large-sized screen, and has a high-definition camera module to capture a still picture and a moving picture, in addition to a typical function such as communication. Further, the mobile terminal can play a multimedia content such as a music, a video, and the like, and can access a network to perform web surfing. The mobile terminal is gradually evolved to employ a highly effective processor, thereby being able to perform various functions.

Recently, the electronic device can generate or store various types of data. For example, the electronic device can generate and store picture data by using a camera function. For another example, the electronic device can generate and store audio data by using a recording function.

SUMMARY

According to some embodiments, a method is provided for managing data in an electronic device, the method comprising: detecting a request for tagging a data record; selecting a portion of the data record in response to the request; identifying a content item based on the selected portion of the data record; and associating the content item with the data record.

According to some embodiments, an electronic device comprising: an input unit for receiving a request for tagging a data record; and a processor configured to: detect the request for tagging the data record; select a portion of the data record in response to the request; identify a content item based on the selected portion of the data record; and associate the content item with the data record.

According to some embodiments, a non-transitory medium is provided that stores processor-executable instructions, which when executed by the processor cause the processor to: detect a request for tagging a data record; select a portion of the data record in response to the request; identify a content item based on the selected portion of the data record; and associate the content item with the data record.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION

Figure 1:
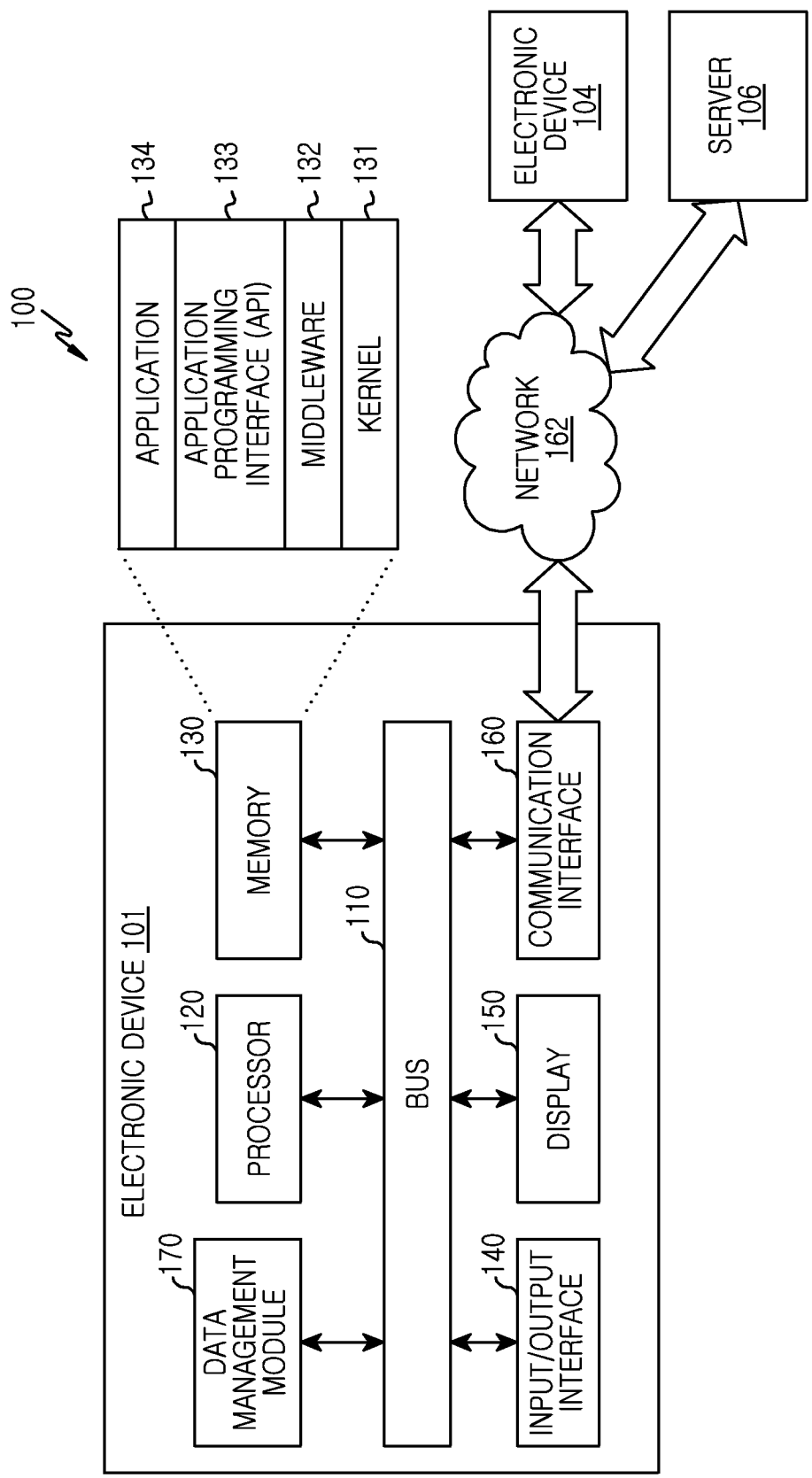
FIG. 1 is a diagram of an example of a network environment, according to embodiments of the disclosure.

Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described in the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning in the context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1 is a view illustrating a network environment 100 including an electronic device 101 according to various embodiments. Referring to FIG. 1, the electronic device 101 may include a bus 110, a processor 120, a memory 130, an input/output (I/O) interface 140, a display 150, a communication interface 160, and a data management module 170.

The bus 110 may be a circuit for connecting the above-described elements with each other, and transferring communication (e.g., a control message) between the above-described elements.

The processor 120 may include any suitable type of processing circuitry, such as a general-purpose processor (e.g., an ARM-based processor), a Field-Programmable Gate Array (FPGA), a Digital Signal Processor (DSP), an Application-Specific Integrated Circuit (ASIC), a Communication Processor (CP), an Application Processor (AP), etc. In operation, the processor 120 may receive, for example, an instruction from the above-described other elements (e.g., the memory 130, the I/O interface 140, the display 150, the communication interface 160, or the data management module 170, etc.) via the bus 110, decipher the received instruction, and execute an operation or a data process corresponding to the deciphered instruction.

The memory 130 may store an instruction or data received from the processor 120 or other elements (e.g., the I/O interface 140, the display 150, the communication interface 160, or the data management module 170, etc.), or generated by the processor 120 or other elements. The memory 130 may include, for example, programming modules such as a kernel 131, a middleware 132, an application programming interface (API) 133, or an application 134. The each of the programming modules may be configured using a software, firmware, hardware, or a combination of two or more of these.

The kernel 131 may control or manage system resources (e.g., the bus 110, the processor 120, or the memory 130, etc.) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

The middleware 132 may perform a mediation role so that the API 133 or the application 134 may communicate with the kernel 131 to give and take data. Also, in connection with task requests received from the applications 134, the middleware 132 may perform a control (e.g., scheduling or load balancing) for a task request using, for example, a method of assigning priority that may use a system resource (e.g., the bus 110, the processor 120, or the memory 130, etc.) of the electronic device 101 to at least one of the applications 134.

The API 133 is an interface for allowing the application 134 to control a function provided by the kernel 131 or the middleware 132, and may include at least one interface or function (e.g., an instruction) for file control, window control, image processing, or character control, etc.

According to various embodiments, the application 134 may include an SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 134 may be an application related to information exchange between the electronic device 101 and an external electronic device (e.g., the electronic device 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 104). Additionally or alternatively, the notification relay application may, for example, receive notification information from an external electronic device (e.g., the electronic device 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 104) communicating with the electronic device 101 and an application operating in the external electronic device or a service (e.g., a communication service or a message service) provided by the external electronic device.

According to various embodiments, the application 134 may include a designated application depending on an attribute (e.g., a kind of an electronic device) of the external electronic device (e.g., the electronic device 104). For example, in the case where the external electronic device is an MP3 player, the application 134 may include an application related to music reproduction. Similarly, in the case where the external electronic device is a mobile medical health care device, the application 134 may include an application related to health care. According to an embodiment, the application 134 may include at least one of an application designated in the electronic device 101 and an application received from the external electronic device (e.g., the server 106 or the electronic device 104).

The I/O interface 140 may transfer an instruction or data input from a user via an I/O unit (e.g., a sensor, a keyboard, or a touchscreen) to the processor 120, the memory 130, the communication interface 160, or the data management module 170 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, or the data management module 170 via the I/O unit (e.g., a speaker or a display). For example, the I/O interface 140 may output voice data processed by the processor 120 to a user via a speaker.

The display 150 may display various information (e.g., multimedia data or text data, etc.) to a user.

The communication interface 160 may connect communication between the electronic device 101 with an external device (e.g., the electronic device 104 or the server 106). For example, the communication interface 160 may be connected with a network 162 via wireless communication or wired communication to communicate with the external device. The wireless communication may, for example, include at least one of Wireless Fidelity (Wi-Fi), Bluetooth (BT), Near Field Communication (NFC), Global Positioning System (GPS), or cellular communication (e.g., LTE, LTE-A, CDMA, WCDMA, UMTS, WiBro, or GSM, etc.). The wired communication may include, for example, at least one of Universal Serial Bus (USB), High Definition Multimedia Interface (HDMI), recommended standard 232 (RS-232), and plain old telephone service (POTS).

According to an embodiment, the network 162 may be a telecommunications network. The telecommunications network may include at least one of a computer network, the Internet, an Internet of things, and a telephone network. According to an embodiment, a protocol (e.g., a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

According to an embodiment, the data management module 170 may control, for example, to generate information capable of representing the subject of storage data when storing the data may, and to store the generate information by associating with the storage data. According to an embodiment, the data management module 170 may acquire image information corresponding to a subject that represents at least a part of data in response to a request. According to an embodiment, the data management module 170 may activate a camera function to acquire the at least one image-type designated the tagging information. According to an embodiment, the data management module 170 may acquires a search word for acquiring the subject that represents at least a part of the storage data by analyzing the storage data, and acquires the tagging information based on the acquired search word.

According to an embodiment, the data management module 170 may edit the tagging information by analyzing the tagging information of the storage data. For example, the data management module 170 may decrease the number of pieces of tagging information. For example, the data management module 170 may combine similar pieces of tagging information as one piece of information. For example, the data management module 170 may change tagging information to another piece of tagging information.

According to an embodiment, the data management module 170 may plays the storage data based on the stored tagging information. For example, the data management module 170 may manage the tagging information as a list, and load and play the storage data corresponding to the tagging information selected by the input.

Additional information for the data management module 170 is provided via FIGS. 2 to 17.

Figure 2:
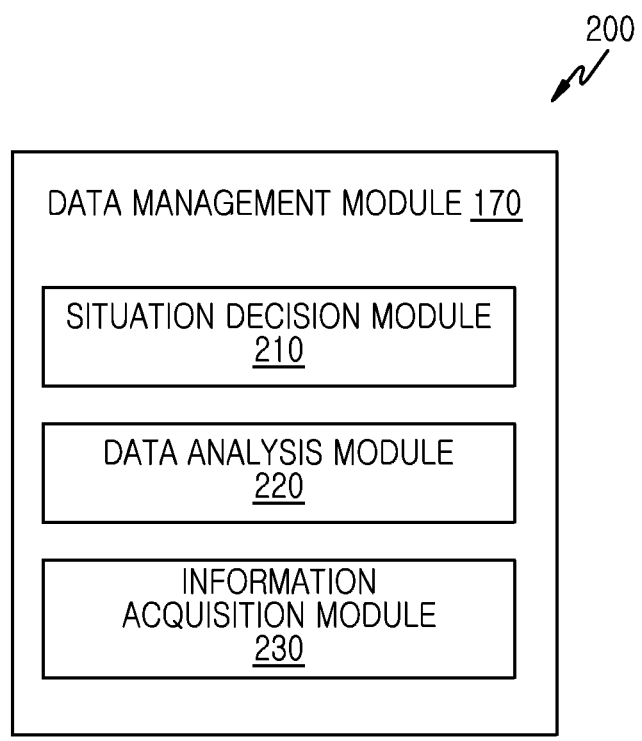
FIG. 2 is a diagram of an example of a data management module, according to embodiments of the disclosure.

FIG. 2 is a diagram of an example of a data management module, according to embodiments of the disclosure. As illustrated in FIG. 2, the data management module 170 may include a situation decision module 210, a data analysis module 220, and an information acquisition module 230.

The situation decision module 210 may detect a triggering condition for generating tagging information or a situation in which the request occurs.

According to various embodiments, the request may occur on the basis of a timer. For example, if the request occurs on the basis of the timer, the situation decision module 210 may execute a timer which operates for a pre-defined time, e.g., 30 seconds, and may treat the expiration of the timer as the triggering condition for generating the tagging information.

According to various embodiments, the triggering condition may be pre-defined play duration. For example, the play duration may be a part of a play duration of data, or may be a time at which the data stops being played and new data starts being played. If the request occurs on the basis of the play duration and a data play order is pre-defined (e.g., a playlist is pre-defined), the situation decision module 210 may treat the ending of the playback one data and the beginning of playback of another data as the triggering condition. In addition, regarding picture data, the situation decision module 210 may decide whether the triggering condition is fulfilled on the basis of a frame order.

According to various embodiments, the triggering condition may be based on a gesture input to the electronic device, a key (e.g., a soft key, a hard key) input, touch input, voice command input, or the like made by a user. For example, when the triggering condition occurs on the basis of input, if an input detected using a sensor, a touch screen, a key button, a microphone, or the like satisfies a predetermined condition, the situation decision module 210 may determine that the triggering condition is fulfilled.

According to various embodiments, the triggering condition may be based on voiceprint recognition, emotion recognition, or the like. For example, the situation decision module 210 may analyze an audio component included in data to recognize a pre-defined voiceprint or a pre-defined emotion and determine that the precondition is fulfilled when the pre-defined voiceprint or emotion is present in the data. As another example, if an audio component for multiple users is included in the data, the situation decision module 210 may analyze the audio component and determine that the triggering condition is fulfilled when a change in a speaking person, and thus decides that it is the situation in which the request occurs.

The situation analysis module 220 may recognize a subject associated with all or some parts of data stored in the electronic device or data to be stored (e.g., audio data that is currently being recorded). According to one embodiment, the subject may be used as a search word for acquiring tagging information.

According to various embodiments, the data analysis module 220 may analyze an audio component to recognize a subject. Herein, the data analysis module 220 may analyze the audio component of the data to recognize a word, sentence, or the like as the subject. According to various embodiments, the data analysis module 220 may recognize the subject on the basis of an extraction order, extraction duration, repetition level, and the volume of a voice pronouncing an extracted word, sentence, or the like.

For example, if the generating of tagging information regarding music data is triggered by the expiration of a timer, the data analysis module 220 may recognize a lyric which is played while the timer is running as a subject. Further, in the case of music data having a play time of 6 minutes, 12 subjects may be recognized, and the recognized subjects may be equal to one another or may not be equal to one another. For example, when the number of repeated lyrics is increased in the music data, the number of identical subjects may be increased.

According to various embodiments, the data analysis module 220 may analyze a text component to confirm a subject for data. For example, data including a text component such as an e-book content, subtitle data, or the like, the text component may be analyzed to recognize a subject for representing the data.

The information acquisition module 230 may acquire tagging information for data in response to a request decided by the situation decision module 210 or a situation in which the request occurs. The tagging information may include information capable of representing a subject of the data. According to one embodiment, the tagging information may include image data, video data, text data, or the like related to the recognized subject. For example, the tagging information may identify a representative word, representative user, an emotion of the representative user, or the like.

According to various embodiments, the information acquisition module 230 may acquire tagging information for data on the basis of the subject recognized by the data analysis module 220. According to various embodiments, the information acquisition module 230 may acquire the tagging information by using the recognized subject as a search word. According to various embodiments, the information acquisition module 230 may execute a web search function, a database search function, or the like, and may acquire the tagging information by using the recognized subject as the search word.

According to various embodiments, the information acquisition module 230 may acquire a surrounding picture as the tagging information in response to a decided request or a situation in which the request occurs. For example, upon detection of a triggering condition for the collection of tagging information, the information acquisition module 230 may activate a camera function to capture an image that is to be used as tagging information.

According to various embodiments, the information acquisition module 230 may acquire situation information that corresponds to the tagging information. Herein, the situation information may include location information, weather information, noise information, or the like when the tagging information is collected.

According to various embodiments, the information acquisition module 230 may edit at least a part of the collected tagging information. Herein, the editing of the tagging information may include decreasing the number of pieces of tagging information or changing a type of the tagging information. For example, the information acquisition module 230 may apply an effect, for example, a mosaic effect, to obscure at least a part of the tagging information. As another example, the information acquisition module 230 may perform a process such that at least two pieces of tagging information having a similarity are used as one piece of tagging information. Herein, the pieces of tagging information have the similarity when the respective pieces of tagging information represent the same subject. For example, when a plurality of pieces of tagging information having the same subject are collected continuously, the information acquisition module 230 may select and use only one of the plurality of pieces of tagging information.

According to various embodiments, an electronic device may include an input unit for receiving a request for generating tagging information, and a processor for confirming a request for generating tagging information regarding at least one part of a content that can be provided through an output device operatively coupled to the electronic device, for deciding a sound corresponding to the at least one part in response to the request, and for acquiring at least one corresponding designated data as the tagging information on the basis of the sound.

According to various embodiments, the processor may store the at least one designated data by associating the designated data with the at least one part.

According to various embodiments, the processor may confirm a subject corresponding to the at least one part on the basis of sound.

According to various embodiments, the processor may receive the at least one designated data from an external device which communicates with the electronic device.

According to various embodiments, the processor may acquire data regarding a surrounding environment in response to the request.

According to various embodiments, the processor may select at least one of a user, a word, a sentence, a phrase, an emotion of the user, and a surrounding noise.

According to various embodiments, the electronic device may further include an output unit for outputting the acquired tagging information, and the processor may execute data associated with the selected tagging information in response to an input for selecting the output tagging information.

According to various embodiments, the processor may acquire the at least one image-type designated data as the tagging information.

Figure 3:
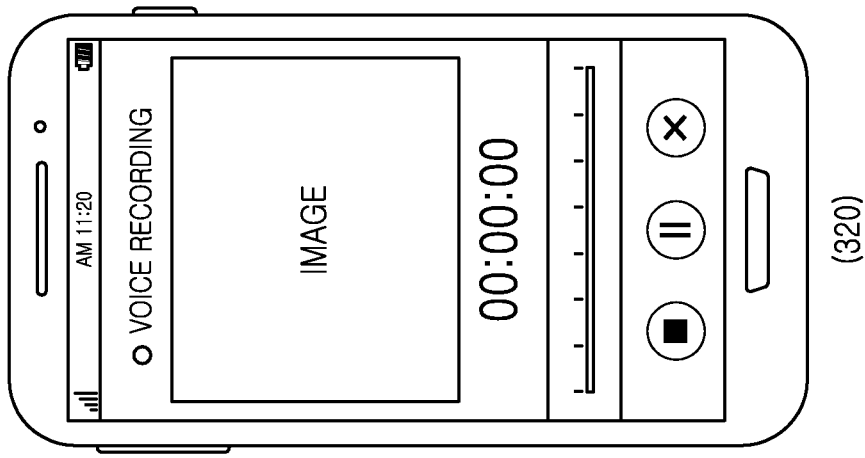
FIG. 3 is a diagram of an example of an interface for collecting tagging information by using a camera function, according to embodiments of the disclosure.
Figure 3:
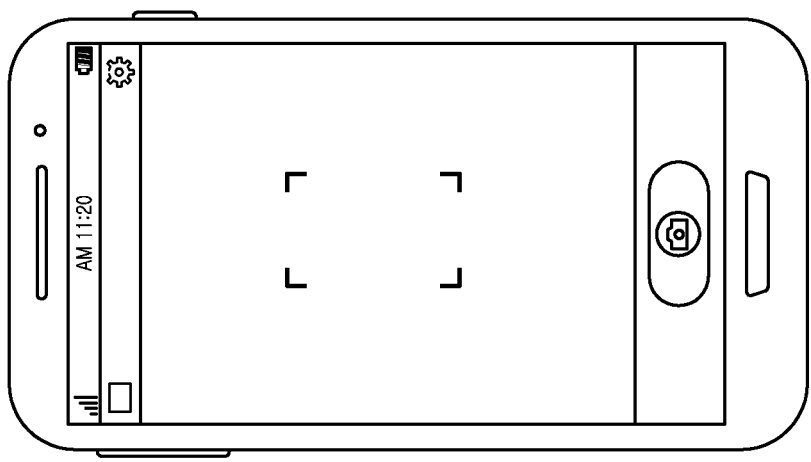
Figure 3:
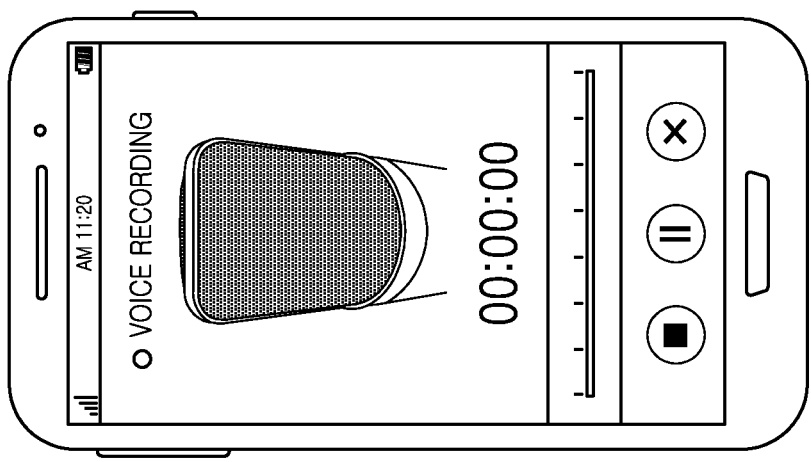

FIG. 3 is a diagram of an example of an interface for collecting tagging information by using a camera function, according to embodiments of the disclosure.

According to one embodiment, the electronic device may store tagging information for data when storing the data. The data may be a digital content including text data, audio data, image data, picture data, or the like, and the tagging information may be information indicating a subject of the data to be stored. According to various embodiments, the electronic device may acquire and store the tagging information when a triggering condition is satisfied (e.g., upon the expiration of a timer, an emotion change, and a change in a speaking person) or through a user request (e.g., a gesture input, a key input, a touch input, a voice command input, etc.). According to one embodiment, the tagging information may include an image (e.g., an original-sized image, a reduced-sized image, etc.). According to various embodiments, the electronic device may collect tagging information for a video by using a plurality of image frames that are part of the video. For example, the electronic device may generate a video by using a plurality of image frames as tagging information. Although in this example the tagging information includes an image, in other implementations it may include any suitable type of content, such as text for example.

According to various embodiments, the electronic device may generate and store audio data by executing a recording function. After executing the recording function, the electronic device may store a signal input to a microphone as audio data from a start time of detecting an input which requests to start recording.

According to various embodiments, the electronic device may generate tagging information regarding audio data during the audio data is generated or stored. According to various embodiments, the electronic device may generate image information as the tagging information. According to various embodiments, the electronic device may detect a request for generating the tagging information. According to various embodiments, the electronic device may determine an audio component (sound) corresponding to at least one part of audio data in response to the request, and may generate the tagging information regarding the audio data on the basis of the determined sound. For example, the electronic device may generate image information related to a sound of one part of the determined audio data as the tagging information in response to the request. According to various embodiments, the electronic device may store the generated tagging information by associating the tagging information with a play location of the audio component in the audio data.

According to various embodiments, the electronic device may acquire an image to be used as tagging information by using a camera function. For example, the electronic device may activate the camera function and thereafter may use a captured image as the tagging information.

More particularly, FIG. 3 shows a situation in which the electronic device executes a camera function (310) upon detection of a request for generating tagging information that is received while the electronic device records audio data by using a microphone (300), and thereafter acquires an image, outputs the image on a preview screen, and stores the image as the tagging information for the audio data that is being recorded. According to various embodiments, the electronic device may output image information stored as tagging information to a part of the screen as illustrated (320). For example, the electronic device may output a list of generated tagging information items or most recently generated tagging information item to a part of a play screen while generating or playing audio data.

In addition, the electronic device may display an identifier according to a pre-defined rule in an audio data duration in which tagging information is generated. The electronic device may display in a play duration of audio data a point at which the tagging information is generated, so that a user can recognize a location at which the tagging information is generated.

Figure 4:
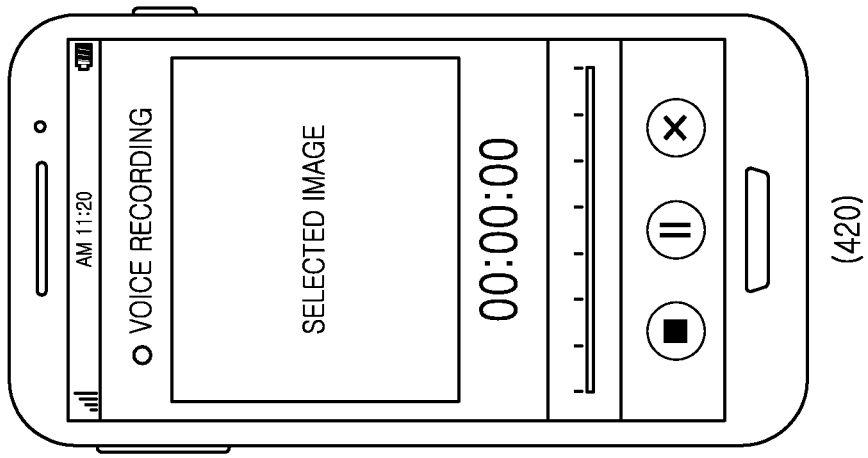
FIG. 4 is a diagram of an example of an interface for collecting tagging information by analyzing audio data, according to embodiments of the disclosure.
Figure 4:
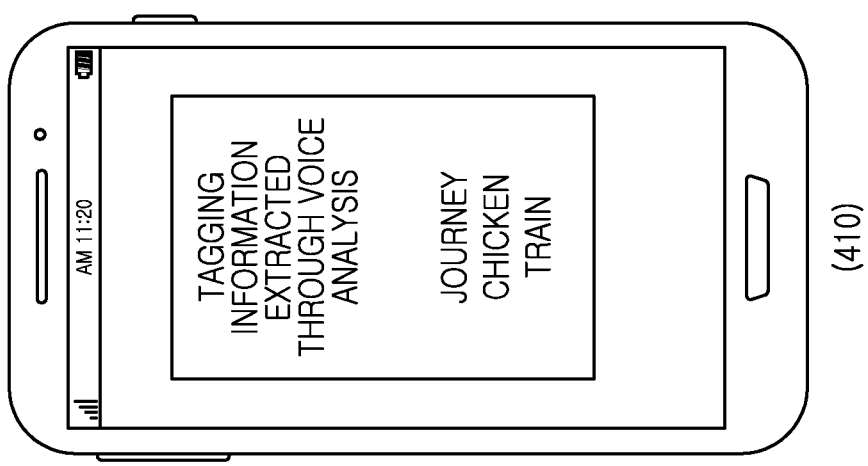
Figure 4:
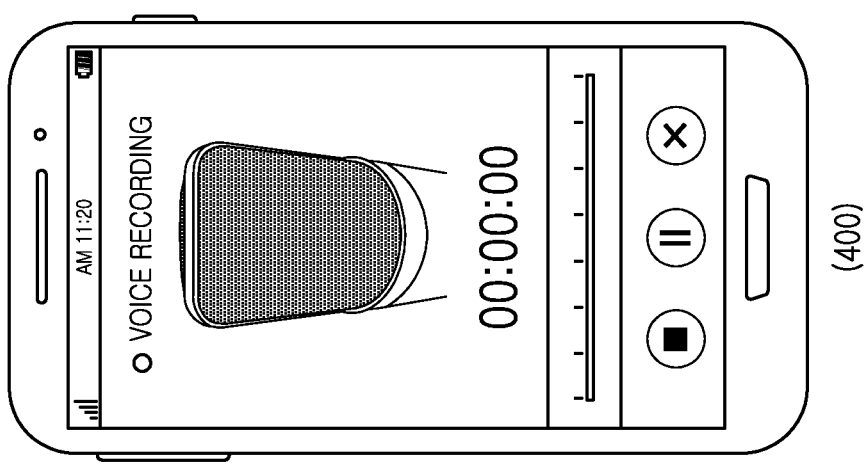

FIG. 4 is a diagram of an example of an interface for collecting tagging information by analyzing audio data, according to embodiments of the disclosure. In the description related to FIG. 4, identical or similar parts described in FIG. 3 will be omitted.

According to various embodiments, the electronic device may analyze audio data in response to a request for generating tagging information, and may acquire an image to be used as the tagging information on the basis of a result of the analysis. According to various embodiments, the electronic device may analyze audio data of a specific duration in response to detecting the request, recognize a subject related to the analyzed audio data, and generate tagging information capable of expressing the subject. For example, the electronic device may analyze audio data to detect a word, sentence, or the like which is repeated greater than or equal to a threshold number of times, and may acquire an image corresponding to the detected word or sentence and use the image as the tagging information. For another example, the electronic device may analyze audio data to detect a word or sentence that is pronounced louder than a threshold, and may acquire an image corresponding to the detected word or sentence and use the image as the tagging information.

According to various embodiments, the electronic device may acquire data, for example, an image corresponding to a word or a sentence, to be used as tagging information by using a web search function, a storage data search function, or the like. For example, the electronic device may acquire an image capable of indicating the subject among pre-stored images. For another example, the electronic device may access a pre-defined web site to discover images capable of indicating the subject, and may acquire one or more images among the discovered images.

More particularly, FIG. 4 shows a situation in which the electronic device detects one or more keywords such as a journey, a chicken, and a train based on a part of audio data while the audio data is being recorded (400), thereafter outputs a list identifying the keywords (410), and obtains an image corresponding to a keyword that is selected from the list by a user, and stores the image as tagging information for the audio data (420).

Figure 5:
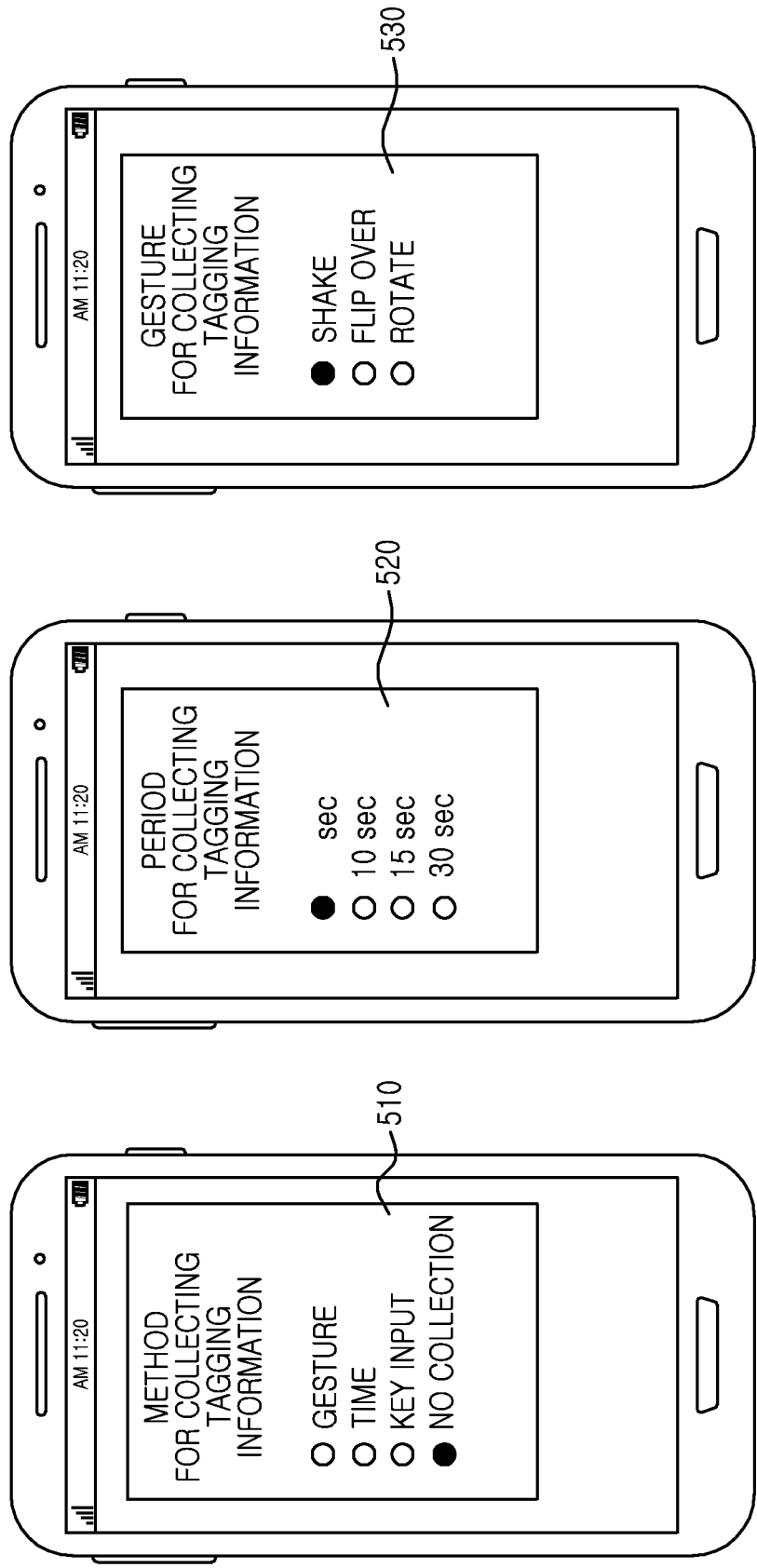
FIG. 5 is a diagram of an example of an interface for collecting tagging information, according to embodiments of the disclosure.

FIG. 5 is a diagram of an example of an interface for collecting tagging information, according to embodiments of the disclosure.

According to one embodiment, the electronic device may store tagging information regarding storage data when storing the data.

According to various embodiments, the electronic device may determine a condition for detecting a request for collecting the tagging information.

According to one embodiment, the electronic device may be configured to collect and store the tagging information in response to detecting a pre-determined gesture. For example, the gesture may be an operation of changing a location or state of the electronic device due to an external influence. For example, the electronic device may use a shake gesture having a pre-determined pattern, a motion gesture having a pre-determined path, a gesture that includes flipping the electronic device over, or the like, as the request for collecting the tagging information.

According to another embodiment, the electronic device may be configured to collect the tagging information at a pre-determined time (e.g., a time instant when a timer expires).

According to another embodiment, the electronic device may be configured to collect and store the tagging information at a time of detecting a pre-determined input (e.g., a pressing of a soft button, a pressing of a hardware button, a voice command, etc.).

More particularly, FIG. 5 shows a situation in which a configuration screen 510 which allows the electronic device to select the triggering condition for collecting the tagging information is output. According to various embodiments, when the user selects the "time" option from the menu 510, the electronic device may output a screen 520 for selecting a period for collecting the tagging information as illustrated.

According to various embodiments, upon a selection of the "gesture" option from the menu 510, the electronic device displays a list 530 of different types of gestures that can be used to trigger the collection of tagging information, and may use a gesture that is selected from the list 530 to trigger the collection of tagging information. The electronic device may provide a list for a pre-defined gesture. According to various embodiments, the electronic device may register to the list a gesture which is not provided and may use it as a request for collecting the tagging information. For example, the electronic device may detect a gesture generated by a user, and may determine this as a gesture for collecting the tagging information.

Figure 6:
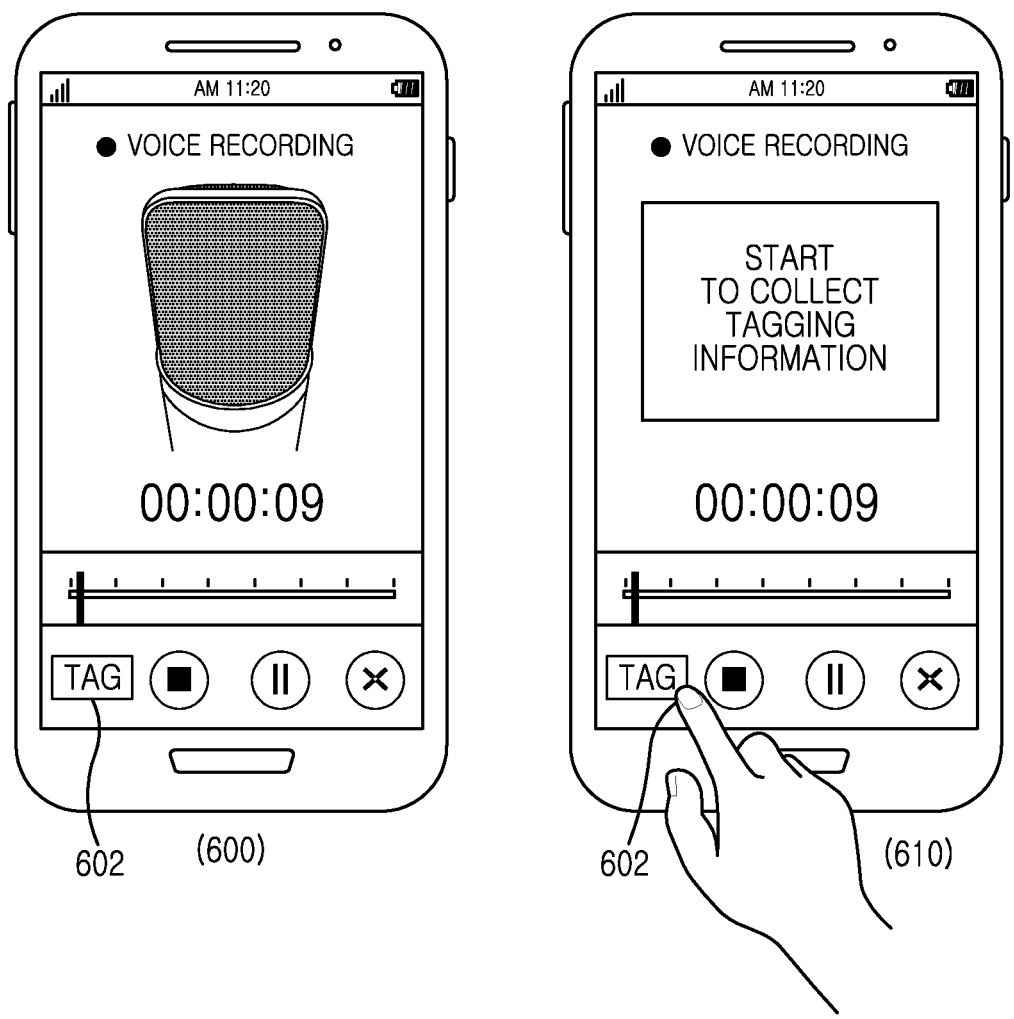
FIG. 6 is a diagram of an example of an interface for collecting tagging information, according to embodiments of the disclosure.

FIG. 6 is a diagram of an example of an interface for collecting tagging information, according to embodiments of the disclosure. In the description related to FIG. 6, identical or similar parts described in FIG. 3 will be omitted.

According to various embodiments, an audio data generation screen 600 may include a screen for controlling an audio data generation function (e.g., a screen including a recording start menu, a recording stop menu, a recording function end menu, etc.), a screen for showing a recording progress status, or the like. According to various embodiments, the electronic device may a button 602 for generating a request for collecting tagging information as illustrated by the audio data generation screen, e.g., a recording function execution screen.

According to various embodiments, upon detection of an input for generating audio data, for example, an input for requesting a recording start, the electronic device may store a signal captured using a microphone as the audio data. During the audio data is generated or a time at which the audio data generation is complete, if the button 602 is activated, the electronic device may begin collecting the tagging information for the audio data while also displaying a notification that indicates that the tagging information is being collected, as shown (610).

For example, upon detection of the input regarding the menu for generating the request, the electronic device may execute a camera function to collect the tagging information for the audio data, or may analyze audio data of a specific duration with respect to a time of detecting the input to collect the tagging information for the audio data by using a web search function, a storage data search function, or the like.

Figure 7:
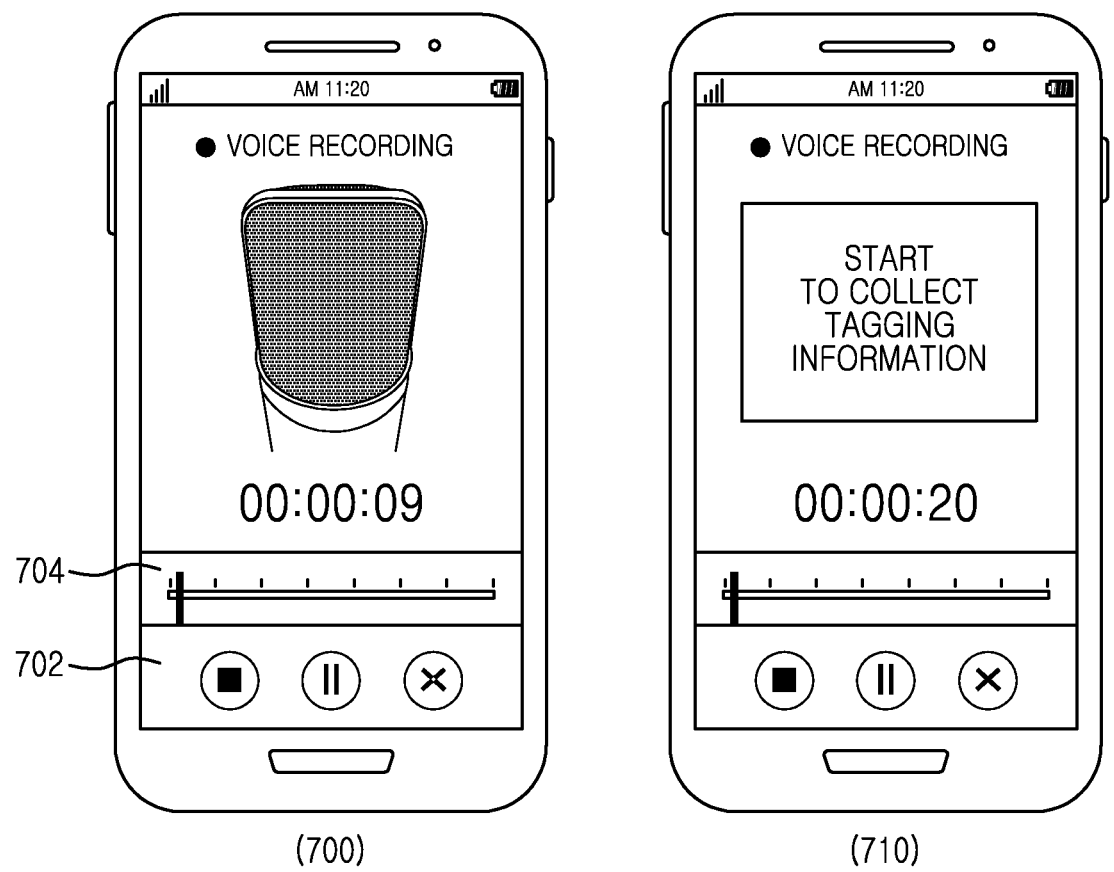
FIG. 7 is a diagram of an example of an interface for collecting tagging information based on a timer, according to embodiments of the disclosure.

FIG. 7 is a diagram of an example of an interface for collecting tagging information based on a timer, according to embodiments of the disclosure. In the description related to FIG. 7, identical or similar parts described in FIG. 3 will be omitted.

According to various embodiments, an audio data generation screen may be displayed (700). The audio data generation screen may include a menu 702 for controlling the recording of audio data, a slider 704 for showing a recording progress status, or the like. According to various embodiments, the recording progress status may be displayed by using time information, a status bar, or the like.

According to various embodiments, the electronic device may detect a request for generating tagging information on the basis of a timer expiring while the audio data is being generated or played.

For example, if a timer period for collecting the tagging information is 20 seconds, the electronic device may generate the tagging information based on data that is played or recorded during the 20-second period. As illustrated, audio data is played or generated until the 20-second period expires, and afterwards the tagging information may be generated based on the audio data that is played or captured during the 20-second period (710). In some implementations, the 20-second period may start when a touch input requesting to tag the audio data is detected. Alternatively, in some implementations, the 20-second period may end when a touch input requesting to tag the audio data is detected According to various embodiments, the electronic device may output information for reporting a collection of tagging information to a part of a screen for generating audio data, a screen for showing a tagging information collection operation (e.g., a camera execution screen, etc.), collected tagging information, or the like, in response to the request.

Figure 8:
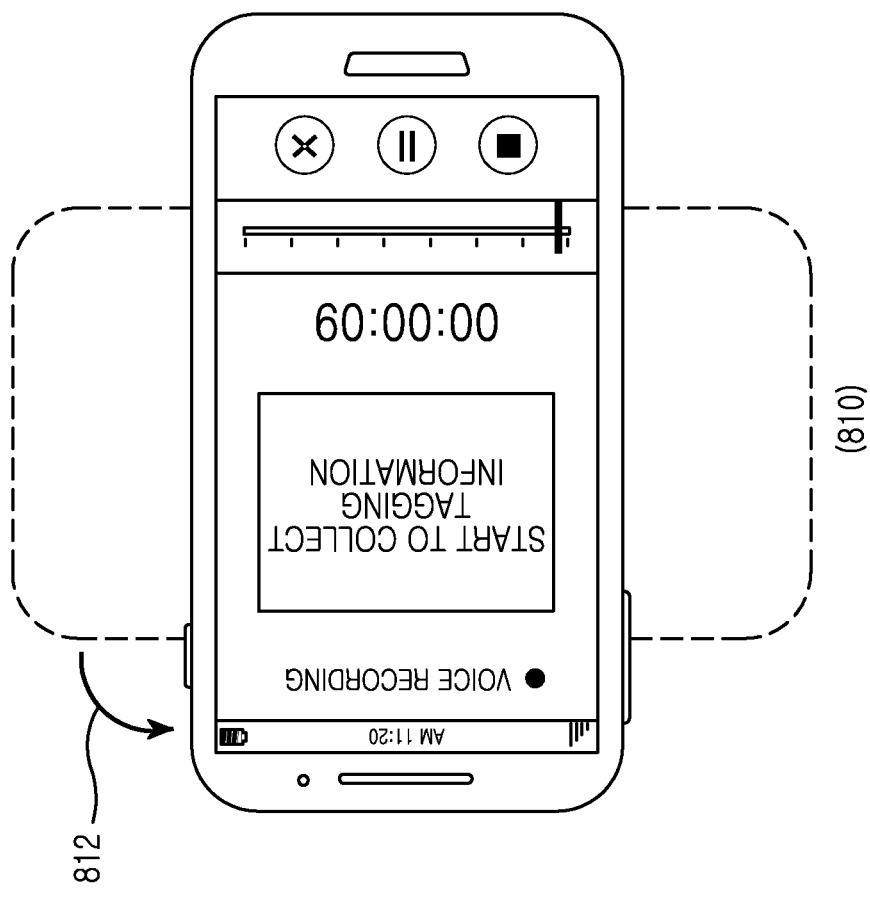
FIG. 8 is a diagram of an example of an interface for collecting tagging information based on an electronic device movement, according to embodiments of the disclosure.
Figure 8:
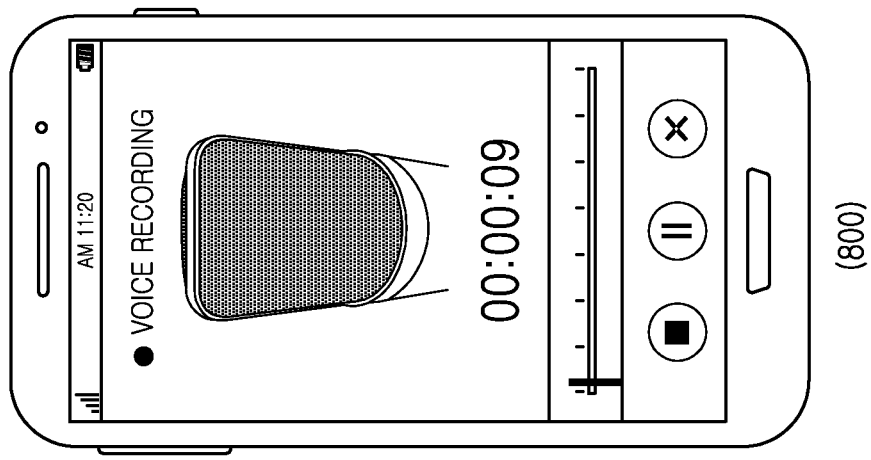

FIG. 8 is a diagram of an example of an interface for collecting tagging information based on an electronic device movement, according to embodiments of the disclosure. In the description related to FIG. 8, identical or similar parts described in FIG. 3 will be omitted.

According to various embodiments, the electronic device may detect a request for generating tagging information on the basis of a gesture input while audio data is being generated (800).

For example, if a gesture for collecting the tagging information is a rotation gesture and if a gesture 812 which rotates in a direction and/or angle that satisfies a condition is detected while the recording is performed, the electronic device may generate the tagging information (810).

According to various embodiments, the electronic device may output information for reporting a collection of tagging information to a part of a screen for generating audio data, a screen for showing a tagging information collection operation (e.g., a camera execution screen, etc.), collected tagging information, or the like, in response to the request.

For example, upon detection of a pre-defined gesture, for example, a rotation of the electronic device, the electronic device may execute a camera function to collect tagging information for audio data, or may analyze audio data of a specific duration with respect to a time of detecting the input to collect the tagging information for the audio data by using a web search function, a storage data search function, or the like.

Figure 9:
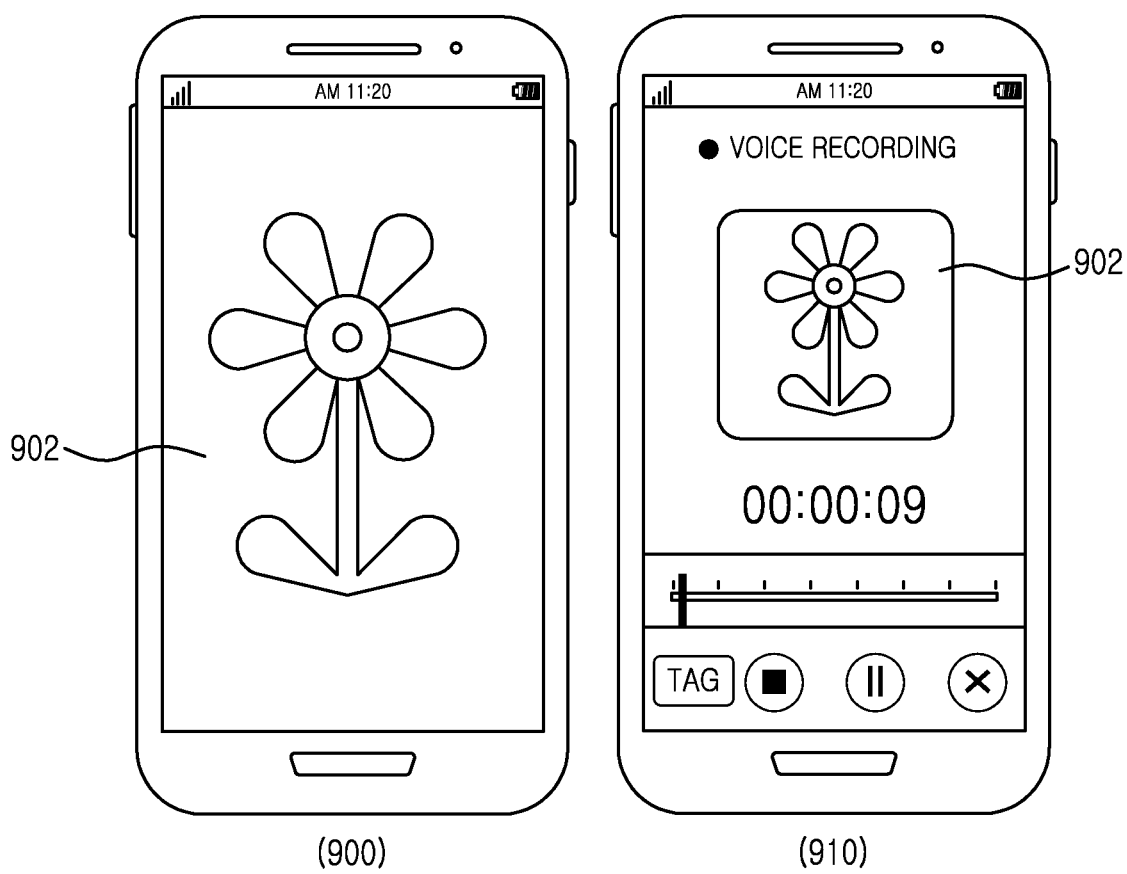
FIG. 9 is a diagram of an example of an interface for collecting tagging information according to embodiments of the disclosure.

FIG. 9 is a diagram of an example of an interface for collecting tagging information according to embodiments of the disclosure.

According to various embodiments, upon detection of a triggering event for generating the tagging information (e.g., detection of a touch input for generating tagging information as shown in FIG. 6, detection of the expiration of a timer, or detection of a gesture for generating tagging information as shown in FIG. 8), the electronic device may generate the tagging information 902 (900), and thereafter may output the generated tagging information 902 in an audio data generation screen (910).

According to various embodiments, the electronic device may detect a user input to acquire an image in which a flower shown in FIG. 9 is a subject, to acquire an image corresponding to a word or sentence (e.g., a word "flower") analyzed among a word, sentence, or the like at a time at which the user input is detected and an image analyzed and stored, or to acquire an image corresponding to the analyzed word or sentence through an external electronic device.

According to various embodiments, the electronic device may use an acquired image as tagging information for audio data, and may store the tagging information by associating with the audio data. For example, the storing of the tagging information by associating with the audio data may be an operation of storing the tagging information by using the audio data or storing the tagging information such that the audio data can be played by using the tagging information.

Figure 10:
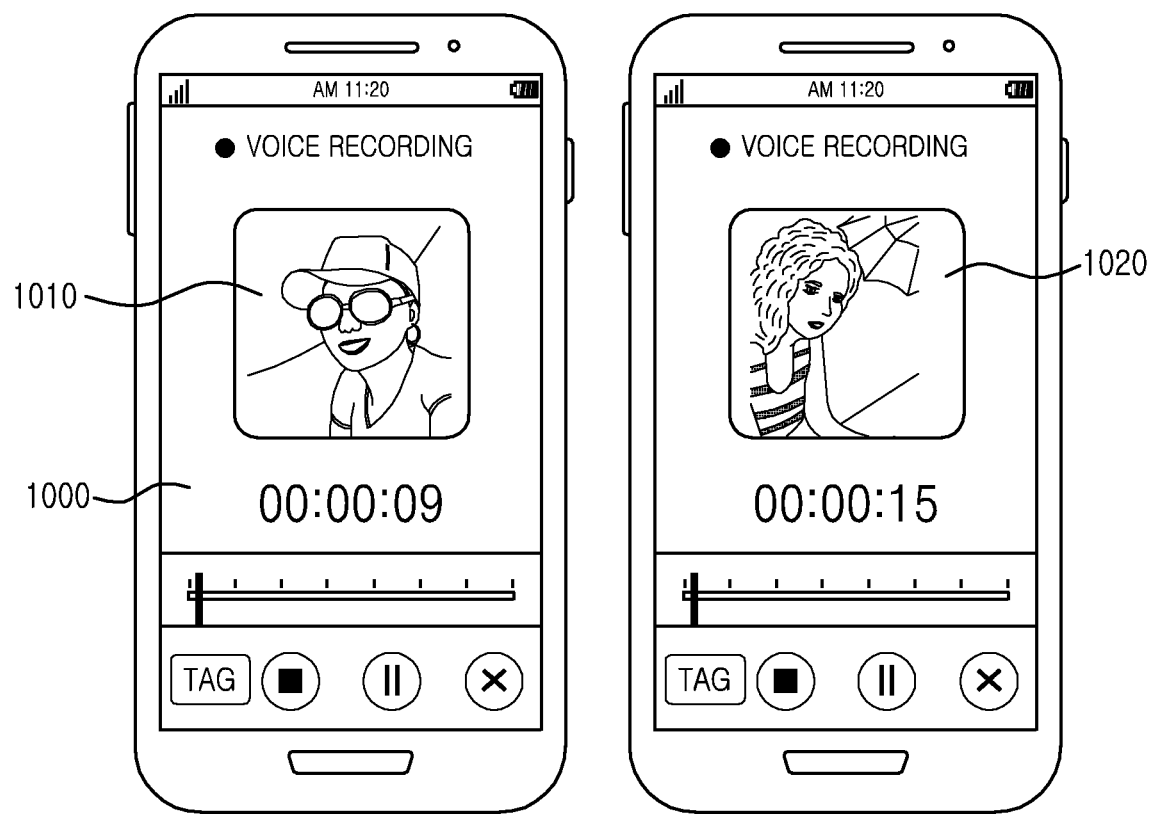
FIG. 10 is a diagram of an example of an interface for collecting tagging information, according to embodiments of the disclosure.
Figure 10:
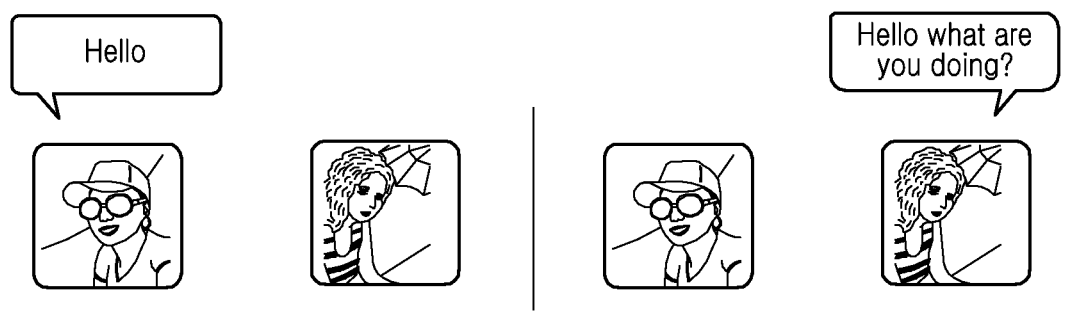

FIG. 10 is a diagram of an example of an interface for collecting tagging information, according to embodiments of the disclosure.

According to one embodiment, the electronic device may generate tagging information on the basis of a voiceprint recognition, an emotion recognition, or the like when data is stored. For example, the electronic device may analyze audio data and generate the tagging information in response to recognizing at least one of an identity of a user (e.g., a speaker that is recorded in the audio data), and a pre-defined emotion of the user. For example, the user may be identified based on the audio data matching a predefined voiceprint that corresponds to the user. According to various embodiments, the electronic device may acquire an image corresponding the user's emotion, age, address, or the like or an image corresponding to a user from an external electronic device or the like, and may use the acquired image as the tagging information.

As another example, upon detection of an audio component for a plurality of users, if the audio component is changed, for example, if a speaking person is changed, the electronic device may determine that it is a situation in which the request occurs. According to various embodiments, the electronic device may generate tagging information every time the speaking person is changed. The electronic device may analyze a voice at a time of a call for each user and store an analysis result for the user, and thereafter may use it to generate the tagging information.

More particularly, FIG. 10 shows a situation in which an electronic device 1000 analyzes audio data that is generated over the course of a telephone call. In this telephone call, users 1010 and 1020 take turns speaking. Every time the one of the users 1010 and 1020 stops speaking and the other one begins, the electronic device may retrieve an image of the person that has just begun speaking. Afterwards, the electronic device may associate the image with a time point in a recording of the telephone call at which the change of the current speaker occurred. For instance, upon detection of a voice of a user A saying "Hello", the electronic device acquires and outputs an image for the user A stored in a phone book, a gallery, or the like, and upon detection of the voice of a user B responding with "Hello what are you doing?", the electronic device acquires and outputs an image of the user B. Although this example is presented in the context of a telephone call recording, in other examples any other suitable type of audio recording can be used, such as the sound track of a video, for example.

Figure 11:
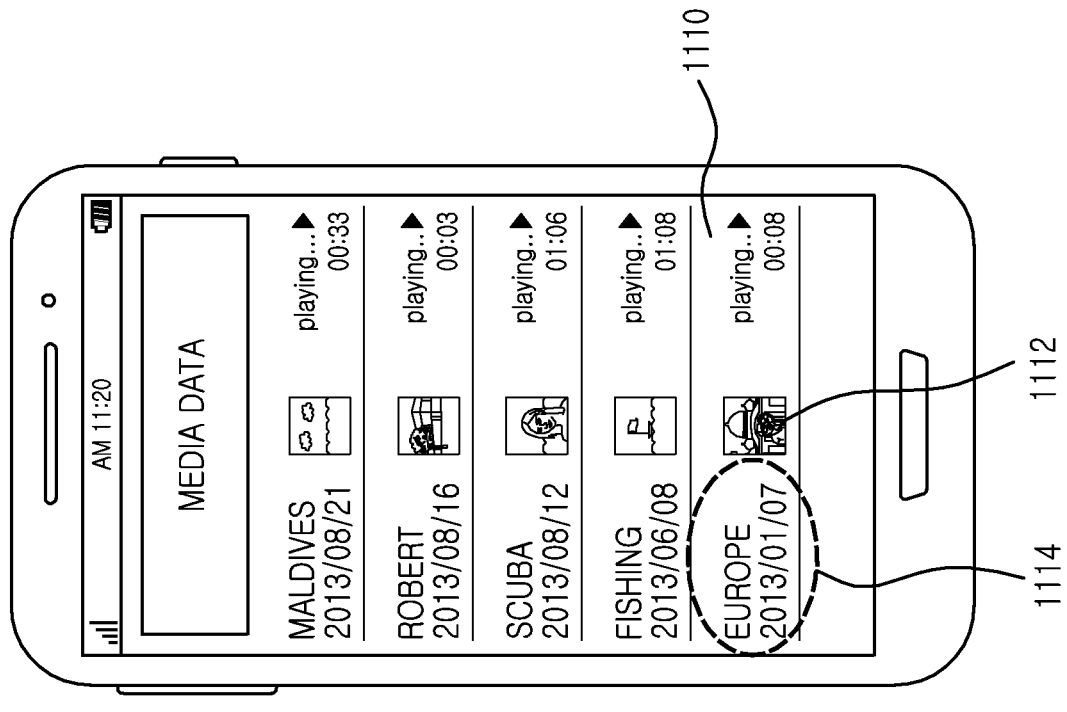
FIG. 11 is a diagram of an example of an interface for managing tagging information, according to embodiments of the disclosure.
Figure 11:
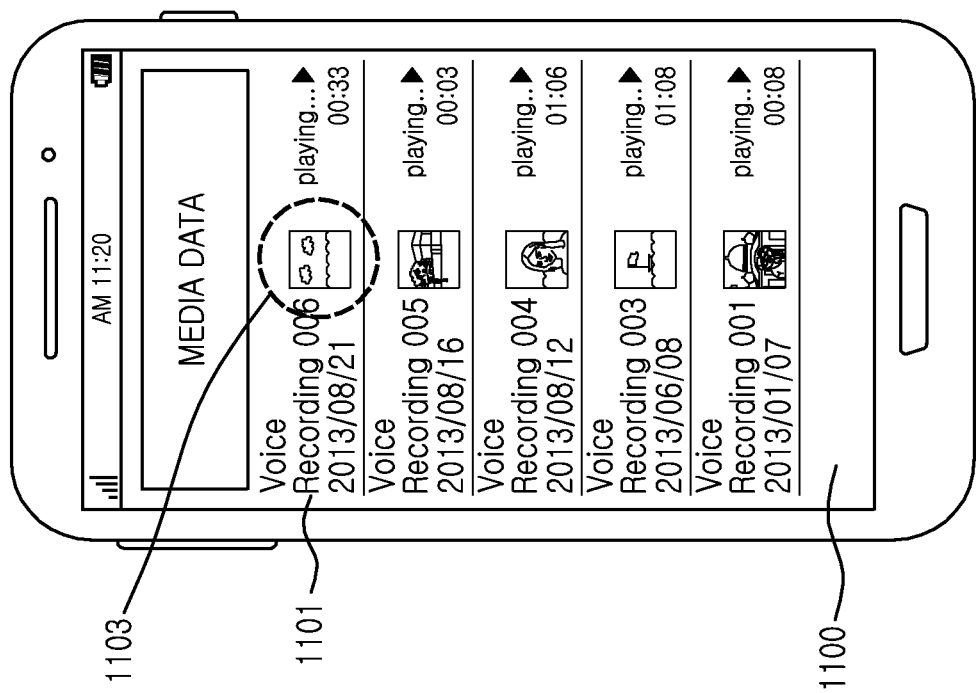

FIG. 11 is a diagram of an example of an interface for managing tagging information, according to embodiments of the disclosure.

According to various embodiments, the electronic device may store data by associating the data with the tagging information when data is stored. According to one embodiment, the electronic device may output the tagging information together with a file name of audio data. For example, image-type tagging information 1103 may be added to a recording file 1101 having a file name "006" and thus may be managed as a list. If a subject included in a recording file is a landscape, the tagging information corresponding to the recording file may be an image corresponding to the landscape.

According to various embodiments, the electronic device may store data by using tagging information as a file name when the data is stored. According to one embodiment, the electronic device may store tagging information included in audio data and text information for expressing the tagging information by using the information as a file name, and may manage this as a list. For example, the electronic device may use tagging information 1112 corresponding to a subject related to Europe and text information 1114 corresponding to Europe for expressing the tagging information as a file name for a recording file.

The illustrated figure shows a situation 1100 in which, the electronic device adds tagging information to a file name regarding audio data and a situation 1110 in which the electronic device uses the tagging information and text information corresponding to the tagging information as a file name. The electronic device may add an indication for indicating that corresponding data which uses tagging information and text information as a file name is a recoding file.

Figure 12:
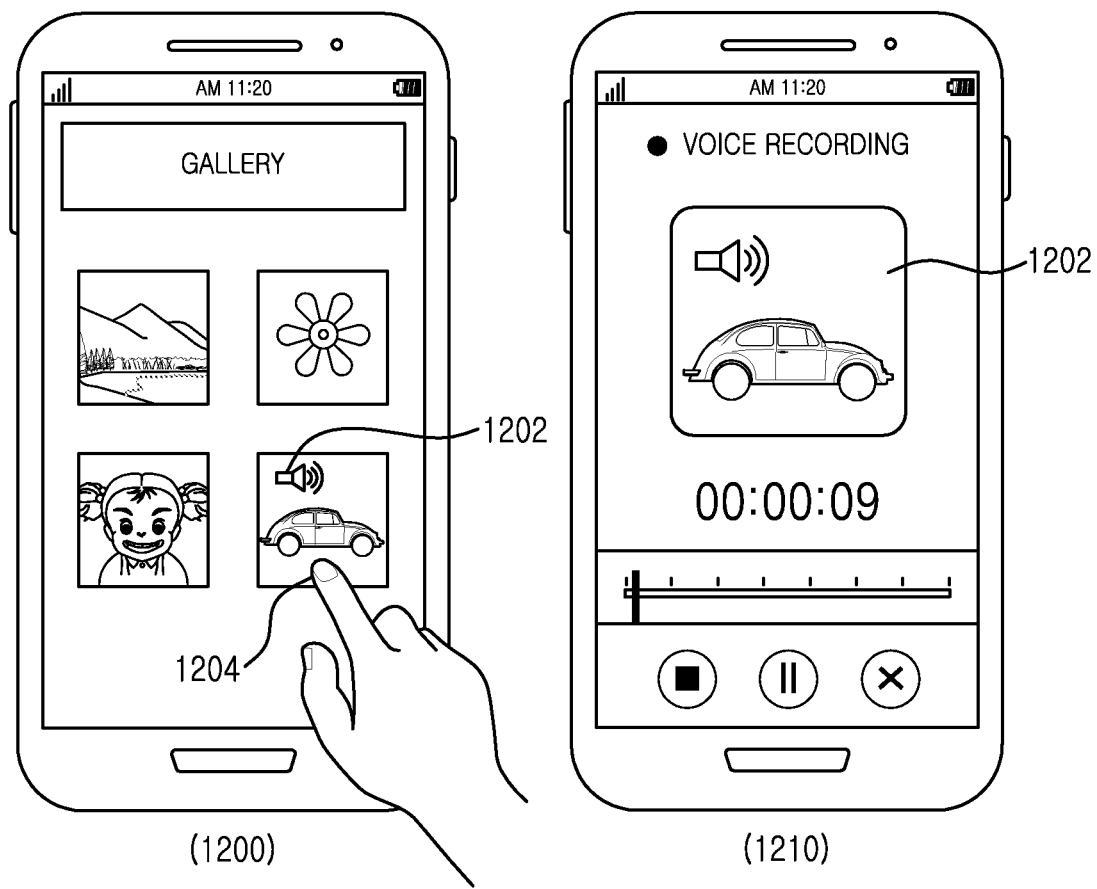
FIG. 12 is a diagram of an example of an interface for rendering of content based on corresponding tagging information, according to embodiments of the disclosure.

FIG. 12 is a diagram of an example of an interface for rendering of content based on corresponding tagging information, according to embodiments of the disclosure.

The electronic device may use a list 1200 to manage the tagging information corresponding to stored data.

According to various embodiments, the tagging information may include image information. The electronic device may collect tagging information regarding audio data, and thereafter may associate this with an image management function. For example, the electronic device may be configured such that audio data is associated with the tagging information, and thereafter may associate the tagging information with an image management function such as a gallery. The tagging information may include information regarding data to be associated, for example, information 1202 indicating that it is tagging information for audio data.

Upon detection of an input 1204 for selecting an image 1202, the electronic device may load and play audio data stored in association with the selected image (1200). Afterwards a content playback screen is displayed that also includes the image (1210). In other words, FIG. 12 shows a situation in which the electronic device executes an image management function to output a list of a plurality of images that are used as tagging information for different audio data records, detects an input for selecting one of the images, and plays the audio data record which the selected image is used as tagging information for.

Figure 13:
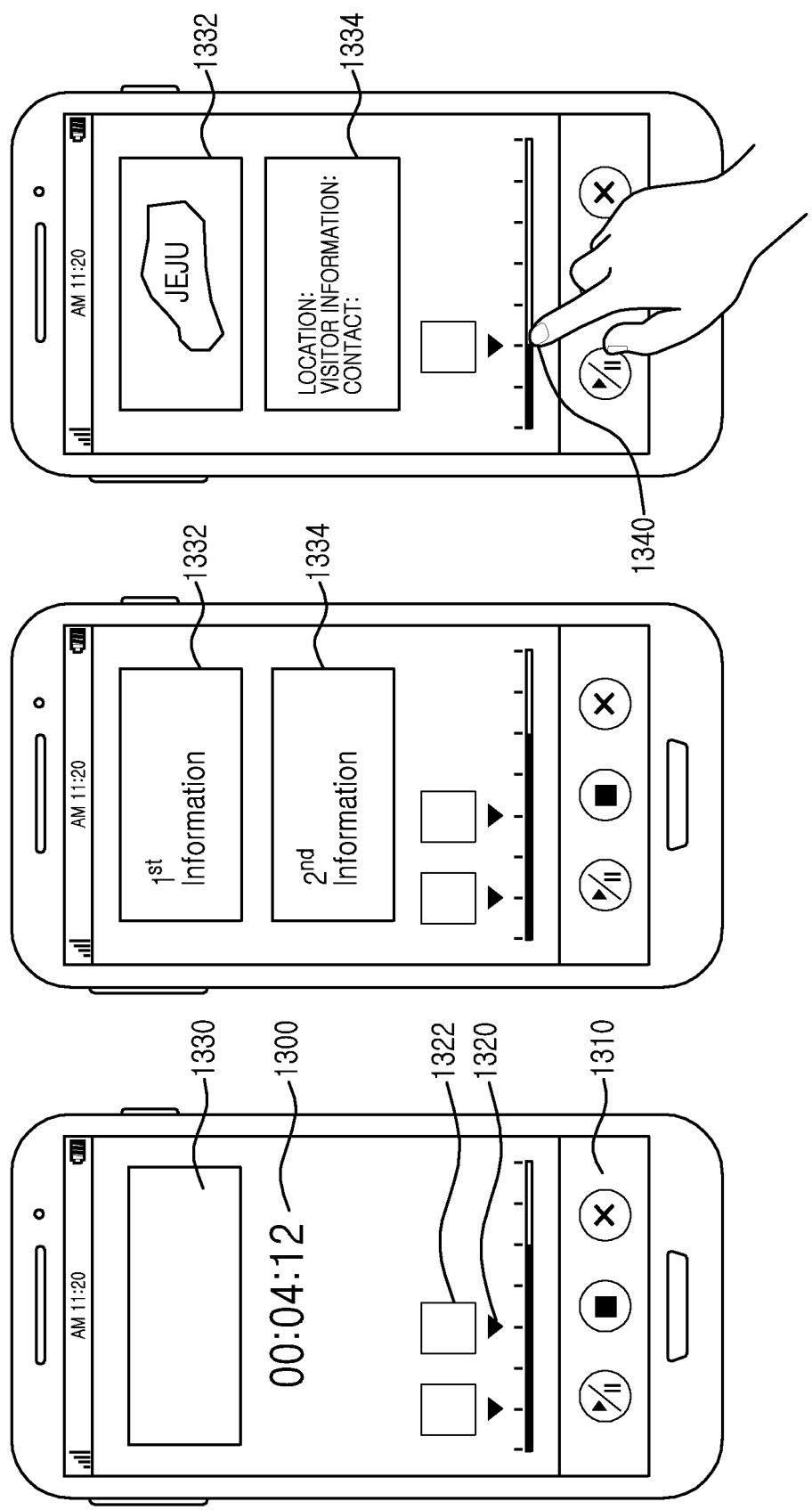
FIG. 13 is a diagram of an example of an interface for collecting tagging information, according to embodiments of the disclosure.

FIG. 13 is a diagram of an example of an interface for collecting tagging information, according to embodiments of the disclosure.

According to various embodiments, the electronic device may collect the tagging information while outputting an audio data generation screen. According to one embodiment, the audio data generation screen may include a screen (e.g., a screen including a recording start request menu, a recording stop request menu, a recording stop request menu, etc.) 1310 for controlling an audio data generation function, a screen 1300 for showing a recording progress status, or the like. The recording progress status may be displayed by using time information, a status bar, or the like.

According to various embodiments, the audio data generation screen may include information 1320 for indicating a location at which tagging information is generated in an audio data duration. In the illustrated figure, the information 1320 is expressed in a triangular shape capable of specifying a position. For example, if the tagging information is generated at a play position corresponding to 30 seconds of audio data, the information may be displayed at a position of 30 seconds, at which the tagging information is generated, in a status bar which expresses a recording progress status. According to various embodiments, the electronic device may output tagging information corresponding to each position at which the tagging information is generated. For example, tagging information (image information) 1322 of which a size is adjusted may be output with respect to each position. In addition, the audio data generation screen may include an area 1330 for outputting recently-generated tagging information.

According to various embodiments, the area 1330 for outputting the recently generated tagging information may include a plurality of tagging information items. According to one embodiment, the area may include an area 1332 for outputting 1st tagging information and an area 1334 for outputting $2^{nd}$ tagging information. According to one embodiment, the $1^{st}$ tagging information may include data acquired by using a camera function, a web search function, a data search function, or the like, and the $2^{nd}$ tagging information may be additional information for the $1^{st}$ tagging information. For example, the $2^{nd}$ tagging information may include context information of the electronic device for a time at which the $1^{st}$ tagging information is acquired and detailed information of the $1^{st}$ tagging information.

According to one embodiment, the electronic device may analyze audio data to acquire an image corresponding to Jeju island as the $1^{st}$ tagging information, and may acquire location information of the electronic device which acquires the $1^{st}$ tagging information corresponding to the Jeju island as the $2^{nd}$ tagging information.

According to another embodiment, the electronic device may analyze audio data to acquire an image corresponding to the Jeju island as the $1^{st}$ tagging information, and may acquire additional information for the Jeju island as the $2^{nd}$ tagging information.

Upon detection of an input 1340 specifying a time point in the audio data, tagging information for the duration (e.g., the $1^{st}$ tagging information 1332 and the $2^{nd}$ tagging information 1334) may be output.

Figure 14:
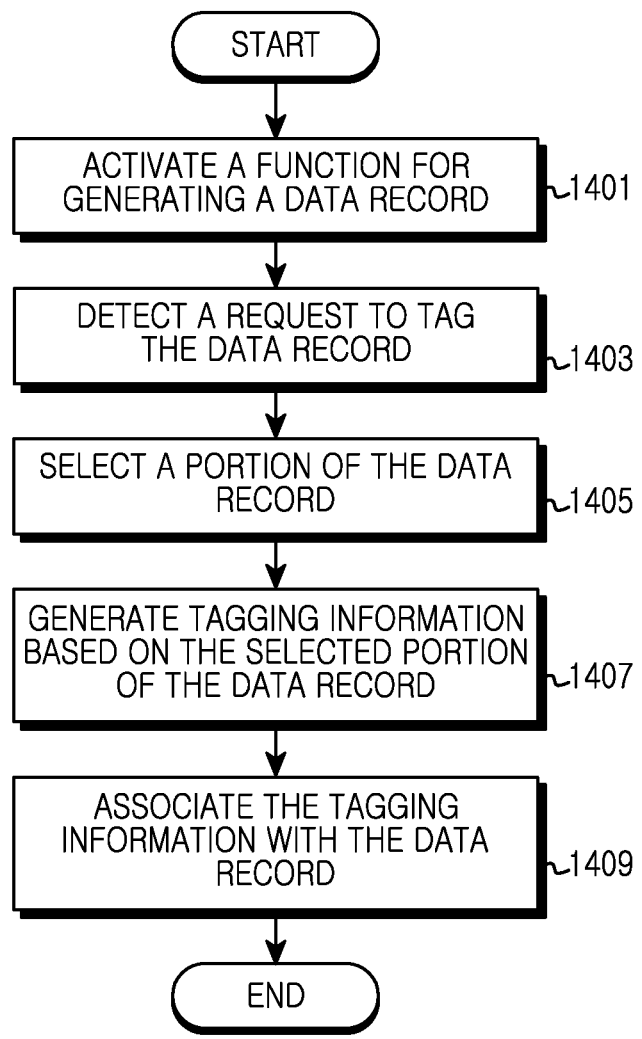
FIG. 14 is a flowchart of an example of a process for collecting tagging information, according embodiments of the disclosure.

FIG. 14 is a flowchart of an example of a process for collecting tagging information, according to embodiments of the disclosure.

In operation 1401, the electronic device may activate a data generation function for generating a data record. Herein, the data record may include a text file, an audio file, an image file, a video file, a portion of a file that includes audio, a portion of a file that includes one or more images, a portion of a file that includes text, and/or any other suitable type of content, regardless of the format in which the content is stored in the volatile and/or non-volatile memory of the electronic device. According to one embodiment, the electronic device may activate an audio recording function.

In an operation 1403, the electronic device may detect a request for generating tagging information. According to one embodiment, the request may be submitted via a key input, a voice command input, a gesture input, or the like. Although in this example the generation of the tagging information is triggered by the detection of user input, in other implementations the generation of the triggering information may be triggered by the expiration of a timer.

In operation 1405, the electronic device may select a portion of the data record that is being generated by the data generation function. According to one embodiment, the portion may be selected on the basis of a sound, word, sentence, or the like that is represented by the data portion. According to another embodiment, the portion may be generated on the basis of the time at which the request is detected. For example, in the context of an audio recording, the portion may include the last 20 seconds of audio that were recorded prior to the receipt of the request.

In operation 1407, the electronic device may generate tagging information on the basis of the selected portion of the data record. For example, the tagging information may include an image, text, video, or the like. For example, the tagging information may be generated based on a content item (e.g., a keyword) that is present in the selected portion of the content. As another example, the tagging information may be generated based on background noise that is present in the selected portion of the data record. By way of example, generating the tagging information may include retrieving the tagging information from a remote device, retrieving the tagging information from memory, modifying the tagging information, and/or creating the tagging information.

In some implementations, the tagging information may be generated based on a current context of the electronic device. For example, the current context may include the current location of the electronic device, ambient noise in the surroundings of the electronic device, the weather at location of the electronic device, or the like.

In operation 1409, the electronic device may store the generated tagging information. According to various embodiments, the electronic device may store the tagging information by associating the tagging information with the data record that is being generated. For example, the electronic device may add the tagging information to meta information of the data or may add the tagging information to the name of a file containing the data. Although in this example the data record is being generated concurrently with the tagging information, in other instances the data record may be generated beforehand. In such instances, the data record may be either generated by the electronic device or another device.

Figure 15:
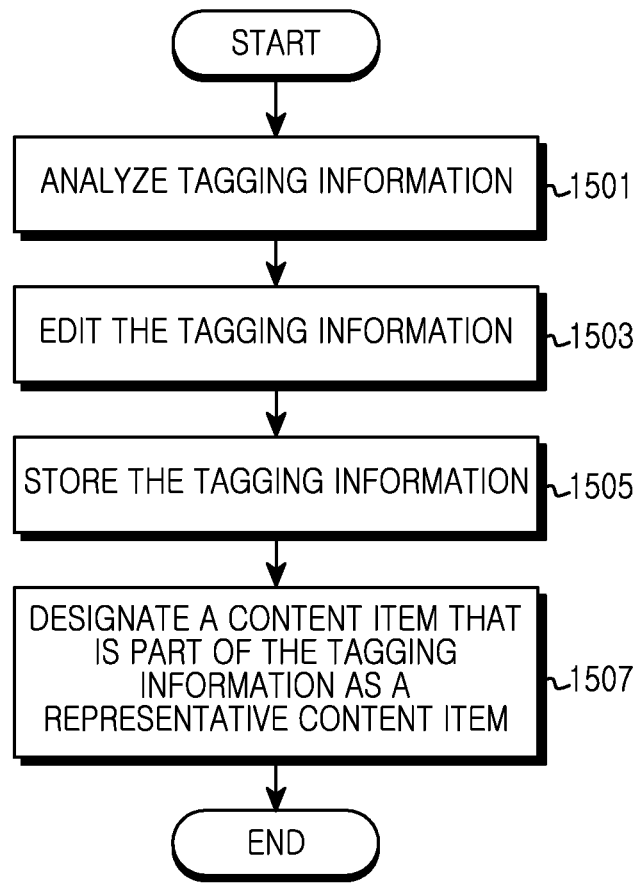
FIG. 15 is a is a flowchart of an example of a process for editing tagging information, according to embodiments of the disclosure.

FIG. 15 is a flowchart of an example of a process for editing tagging information, according to embodiments of the disclosure.

In operation 1501, the electronic device may analyze tagging information that is associated with a data record. According to one embodiment, the tagging information may include a plurality of content items, and the electronic device may analyze the tagging information to combine similar content items as one piece of information. For example, the content items may be considered similar when they represent the same subject.

In operation 1503, the electronic device may edit the tagging information according to similarity. According to various embodiments, the electronic device may select and use only one of a set of content items that are found to be similar with one another, or may replace one content item with another.

In operation 1505, the electronic device may store the edited tagging information in response to an input. According to one embodiment, upon detection of an input for storing the edited tagging information, the electronic device may replace old tagging information with newly edited tagging information.

In operation 1507, the electronic device may designate a given content item that is part of the tagging information as representative content item.

For example, the representative information may be used to generate a file name or search word for the data. According to various embodiments, the electronic device may designate a content item as representative content item based on a priority that is assigned to the content item. For example, the priority may be based on an order in which the content item is required, a repetition level of the content item, or the like.

Figure 16:
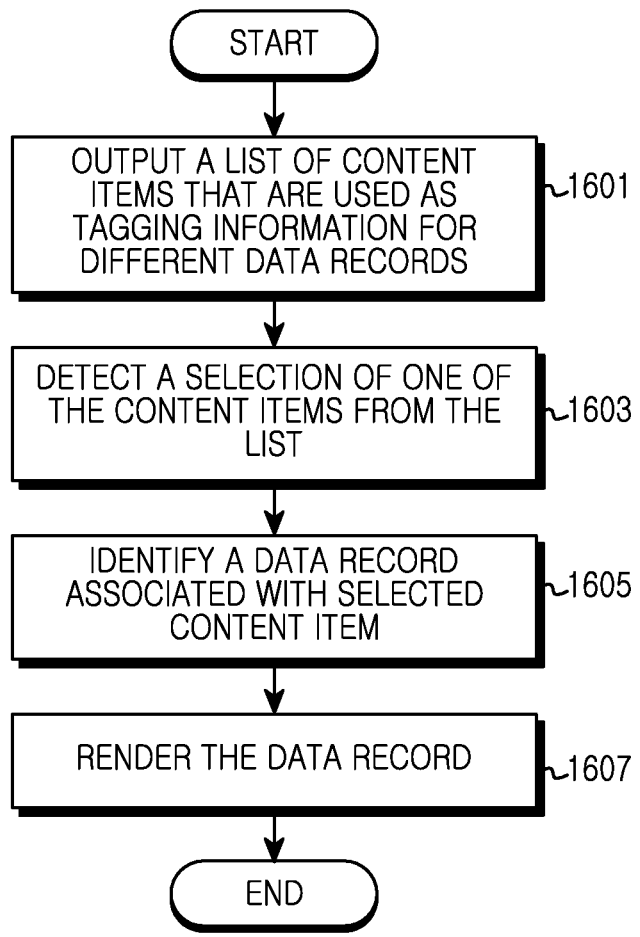
FIG. 16 is a flowchart of an example of a process for managing tagging information, according to embodiments of the disclosure.

FIG. 16 is a flowchart of an example of a process for managing tagging information, according to embodiments of the disclosure.

In operation 1601, the electronic device may output a list of content items that are used as tagging information for different data records.

In operation 1603, the electronic device may detect a selection of one of the content items from the list.

In operation 1605, the electronic device may identify a data record associated with the selected content item. According to embodiments of the disclosure, a data record may be considered associated with the selected content item if that content item is used as tagging information for that data record.

In an operation 1607, the electronic device may render the data record. For example, when the data record includes an audio file, the electronic device may play the audio file.

According to various embodiments, a method of an electronic device may include confirming a request for generating tagging information regarding at least one part of a content that can be provided through an output device operatively coupled to the electronic device, deciding a sound corresponding to the at least one part in response to the request, and acquiring at least one corresponding designated data as the tagging information on the basis of the sound.

According to various embodiments, the method may further include storing the at least one designated data by associating with the at least one part.

According to various embodiments, the acquiring may include confirming a subject corresponding to the at least one part on the basis of the sound.

According to various embodiments, the acquiring may include receiving the at least one designated data from an external device which communicates with the electronic device.

According to various embodiments, the acquiring may include acquiring data regarding a surrounding environment in response to the request.

According to various embodiments, the deciding of the sound may include at least one of operations of: identifying a user, recognizing at least one of a word, a sentence, and a phrase, recognizing an emotion of a user, and recognizing a surrounding noise.

According to various embodiments, the method of the electronic device may further include outputting the acquired tagging information, and executing data associated with the selected tagging information in response to an input for selecting the output tagging information.

According to various embodiments, the at least one designated data may include image-type data.

Figure 17:
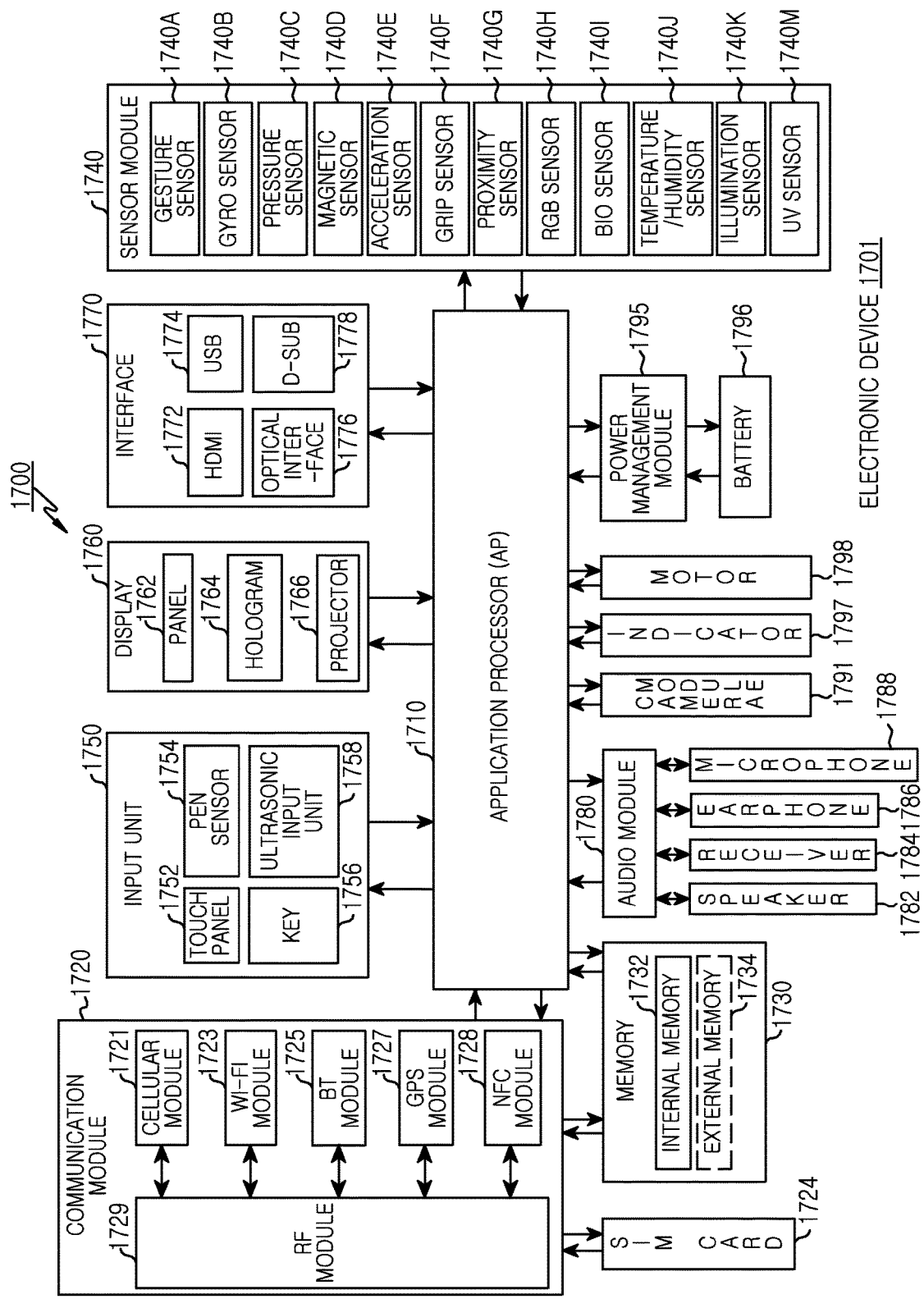
FIG. 17 illustrates a block diagram of an example of an electronic device according to embodiments of the disclosure.

FIG. 17 is a block diagram 1700 illustrating an electronic device 1701 according to various embodiments. The electronic device 1701 may configure, for example, all or a portion of the electronic device 101 illustrated in FIG. 1. Referring to FIG. 17, the electronic device 1701 may include one or more application processors (AP) 1710, a communication module 1720, a subscriber identification module (SIM) card 1724, a memory 1730, a sensor module 1740, an input unit 1750, a display 1760, an interface 1770, an audio module 1780, a camera module 1791, a power management module 1795, a battery 1796, an indicator 1797, or a motor 1798.

The AP 1710 may drive an OS or an application to control a plurality of hardware or software elements connected to the AP 1710, and perform various data processes including multimedia data and operations. The AP 1710 may be implemented, for example, as a system on chip (SoC). According to an embodiment, the AP 1710 may further include a graphic processing unit (GPU) (not shown).

The communication module 1720 (e.g., the communication interface 160) may perform data transmission/reception in communication between the electronic device 1701 (e.g., the electronic device 101) and other electronic devices (e.g., the electronic device 104 or the server 106) connected via a network. According to an embodiment, the communication module 1720 may include a cellular module 1721, a Wi-Fi module 1723, a BT module 1725, a GPS module 1727, an NFC module 1728, and a Radio Frequency (RF) module 1729.

The cellular module 1721 may provide voice communication, image communication, a short message service, or an Internet service, etc. via a communication network (e.g., LTE, LTE-A, CDMA, WCDMA, UMTS, WiBro, or GSM, etc.). Also, the cellular module 1721 may perform discrimination and authentication of an electronic device within a communication network using, for example, a subscriber identify module (e.g., a SIM card 1724). According to an embodiment, the cellular module 1721 may perform at least a portion of functions that may be provided by the AP 1710. For example, the cellular module 1721 may perform at least a portion of a multimedia control function.

According to an embodiment, the cellular module 1721 may include a communication processor (CP). Also, the cellular module 1721 may be, for example, implemented as a SoC. Though elements such as the cellular module 1721 (e.g., a communication processor), the memory 1730, or the power management module 1795, etc. are illustrated as elements separated from the AP 1710 in FIG. 17, according to an embodiment, the AP 1710 may be implemented to include at least a portion (e.g., the cellular module 1721) of the above-described elements.

According to an embodiment, the AP 1710 or the cellular module 1721 (e.g., a communication processor) may load an instruction or data received from at least one of a non-volatile memory and other elements connected thereto onto a volatile memory, and process the same. Also, the AP 1710 or the cellular module 1721 may store data received from at least one of other elements or generated by at least one of other elements in a non-volatile memory.

Each of the Wi-Fi module 1723, the BT module 1725, the GPS module 1727, or the NFC module 1728 may include, for example, a processor for processing data transmitted/received via a relevant module. Though the cellular module 1721, the Wi-Fi module 1723, the BT module 1725, the GPS module 1727, or the NFC module 1728 are illustrated as separate blocks in FIG. 17, according to an embodiment, at least a portion (e.g., two or more elements) of the cellular module 1721, the Wi-Fi module 1723, the BT module 1725, the GPS module 1727, or the NFC module 1728 may be included in one Integrated Circuit (IC) or an IC package. For example, at least a portion (e.g., a communication processor corresponding to the cellular module 1721 and a Wi-Fi processor corresponding to the Wi-Fi module 1723) of processors corresponding to each of the cellular module 1721, the Wi-Fi module 1723, the BT module 1725, the GPS module 1727, or the NFC module 1728 may be implemented as one SoC.

The RF module 1729 may perform transmission/reception of data, for example, transmission/reception of an RF signal. The RF module 1729 may include, for example, a transceiver, a power amp module (PAM), a frequency filter, or a low noise amplifier (LNA), etc., though not shown. Also, the RF module 1729 may further include a part for transmitting/receiving an electromagnetic wave on a free space in wireless communication, for example, a conductor or a conducting line, etc. Though FIG. 17 illustrates the cellular module 1721, the Wi-Fi module 1723, the BT module 1725, the GPS module 1727, and the NFC module 1728 share one RF module 1729, according to an embodiment, at least one of the cellular module 1721, the Wi-Fi module 1723, the BT module 1725, the GPS module 1727, or the NFC module 1728 may perform transmission/reception of an RF signal via a separate RF module.

The SIM card 1724 may be a card including a subscriber identify module, and may be inserted into a slot formed in a specific position of the electronic device. The SIM card 1724 may include unique identify information (e.g., integrated circuit card identifier (ICCID)) or subscriber information (e.g., international mobile subscriber identity (IMSI)).

The memory 1730 (e.g., the memory 170) may include a built-in memory 1732 or an external memory 1734. The built-in memory 1732 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 1732 may be a Solid State Drive (SSD). The external memory 1734 may further include a flash drive, for example, compact flash (CF), secure digital (SD), micro secure digital (Micro-SD), mini secure digital (Mini-SD), extreme digital (xD), or a memory stick. The external memory 1734 may be functionally connected with the electronic device 1701 via various interfaces. According to an embodiment, the electronic device 1701 may further include a storage device (or a storage medium) such as a hard drive.

The sensor module 1740 may measure a physical quantity or detect an operation state of the electronic device 1701, and convert the measured or detected information to an electric signal. The sensor module 1740 may include, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (e.g., RGB (red, green, blue) sensor), a living body sensor 1740I, a temperature/humidity sensor 1740J, an illuminance sensor 1740K, or an ultra violet (UV) sensor 1740M. Additionally or alternatively, the sensor module 1740 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 1740 may further include a control circuit for controlling at least one sensor belonging thereto.

The input unit 1750 may include a touch panel 1752, a (digital) pen sensor 1754, a key 1756, or an ultrasonic input unit 1758. The touch panel 1752 may recognize a touch input using at least one of capacitive, resistive, infrared, or ultrasonic methods. Also, the touch panel 1752 may further include a control circuit. A capacitive touch panel may perform detection by a physical contact or proximity recognition. The touch panel 1752 may further include a tactile layer. In this case, the touch panel 1752 may provide a tactile reaction to a user.

The (digital) pen sensor 1754 may be implemented using, for example, a method which is the same as or similar to receiving a user's touch input, or using a separate sheet for detection. The key 1756 may include, for example, a physical button, an optical key or keypad. The ultrasonic input unit 1758 is a unit for recognizing data by detecting a sound wave using a microphone (e.g., a microphone 1788) in the electronic device 1701 via an input tool generating an ultrasonic signal, and enables wireless recognition. According to an embodiment, the electronic device 1701 may receive a user input from an external device (e.g., a computer or a server) connected to the communication module 1720 using the communication module 1720.

The display 1760 (e.g., the display 150) may include a panel 1762, a hologram device 1764, or a projector 1766. The panel 1762 may be, for example, a liquid crystal display (LCD), or an active-matrix organic light-emitting diode (AM-OLED), etc. The panel 1762 may be implemented, for example, such that it is flexible, transparent, or wearable. The panel 1762 may be configured as one module together with the touch panel 1752. The hologram device 1764 may show a three-dimensional image in the air using interferences of light. The projector 1766 may project light onto a screen to display an image. The screen may be positioned, for example, inside or outside the electronic device 1701. According to an embodiment, the display 1760 may further include a control circuit for controlling the panel 1762, the hologram device 1764, or the projector 1766.

The interface 1770 may include, for example, a high-definition multimedia interface (HDMI) 1772, a universal serial bus (USB) 1774, an optical interface 1776, or a D-subminiature (D-sub) 1778. The interface 1770 may be included, for example, in the communication interface 160 illustrated in FIG. 1. Additionally or alternatively, the interface 1770 may include, for example, a mobile high-definition link (MHL) interface, a secure digital (SD) card/multimedia card (MMC) interface, or an infrared data association (IrDA) standard interface.

The audio module 1780 may convert a sound and an electric signal in dual directions. At least a partial element of the audio module 1780 may be included, for example, in the I/O interface 140 illustrated in FIG. 1. The audio module 1780 may process sound information input or output via, for example, a speaker 1782, a receiver 1784, an earphone 1786, or a microphone 1788, etc.

The camera module 1791 is a device that may shoot a still image and a moving picture. According to an embodiment, the camera module 1791 may include one or more image sensors (e.g., a front sensor or a rear sensor), a lens (not shown), an image signal processor (ISP) (not shown), or a flash (not shown) (e.g., an LED or xenon lamp).

The power management module 1795 may manage power of the electronic device 1701. Though not shown, the power management module 1795 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 1796, a voltage, a current, or a temperature while charging. The battery 1796 may store or generate electricity, and supply power to the electronic device 1701 using the stored or generated electricity. The battery 1796 may include, for example, a rechargeable battery or a solar battery.

The indicator 1797 may display a specific state of the electronic device 1701 or a portion thereof (e.g., the AP 1710), for example, a booting state, a message state, or a charging state, etc. The motor 1798 may convert an electric signal to mechanical vibration. Though not shown, the electronic device 1701 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described elements of the electronic device according to the present disclosure may be configured using one or more components, and a name of a relevant element may change depending on a kind of the electronic device. An electronic device according to the present disclosure may include at least one of the above-described elements, and a portion of the elements may be omitted, or additional other elements may be further included. Also, a portion of the elements of the electronic device according to the present disclosure may combine to form one entity and equally perform a function of the relevant elements before the combination.

A terminology "module" used for the present disclosure may mean, for example, a unit including a combination of one or two or more among a hardware, a software, or a firmware. A "module" may be interchangeably used with a terminology such as a unit, a logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

According to various embodiments, at least a portion of an apparatus (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magnetooptical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

According to various embodiments, a storage medium storing instructions is provided. The instructions, when executed by at least one processor, are set to allow the at least one processor to perform at least one operation. The at least one operation may include confirming a request for generating tagging information regarding at least one part of a content that can be provided through an output device operatively coupled to the electronic device, deciding a sound corresponding to the at least one part in response to the request, and acquiring at least one corresponding designated data as the tagging information on the basis of the sound.

According to various embodiments, the electronic device generates image information for the duration of the data in a time that satisfies a condition to improve a data search performance.

Also, embodiments of the present disclosure disclosed in the present specification and drawings suggest only a specific example in order to easily explain technical content according to an embodiment of the present disclosure and help understanding the disclosure, and are not intended for limiting the scope of the disclosed subject matter. Therefore, it should be construed that the scope of various embodiments of the present disclosure includes not only the embodiments disclosed herein but also all changes and modified forms derived based on the technical spirit of various embodiments of the disclosure.

FIGS. 1-17 are provided as an example only. At least some of the steps discussed with respect to these figures can be performed concurrently, performed in a different order, and/or altogether omitted. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method for managing data in an electronic device, the method comprising:

displaying, on a display of the electronic device, an interface for recording audio data by the electronic device;

while the audio data is being recorded, detecting, by a processor of the electronic device, an input for acquiring at least one image associated with the audio data, wherein the input is at least one of a key input, a touch input, and a designated movement of the electronic device;

in response to detecting the input, identifying, by the processor, a portion of the audio data, wherein the portion of the audio data is audio data which is recorded during a designated duration based on a time when the input is detected;

in response to identifying the portion of the audio data, acquiring, by the processor, at least one word from the portion of the audio data;

in response to acquiring the at least one word, acquiring, by the processor, the at least one image which is, based on the at least one word, searched for through an external electronic device; and in response to acquiring the at least one image, storing the at least one image in association with the audio data in a memory of the electronic device, wherein the portion of the audio data is outputted when the at least one image is selected among a plurality of images.

2. The method of claim 1, wherein:

the portion of the audio data includes audio data corresponding to a sound, the sound being inputted to the electronic device for the designated duration before the time when the input is detected.

3. The method of claim 1, wherein the at least one image includes an image associated with a meaning of the at least one word.

4. The method of claim 1, wherein the at least one image includes an image associated with a subject which is obtained from the at least one word.

5. The method of claim 1, further comprising:

in response to detecting the input, activating, by the processor, a camera of the electronic device while recording the audio data;

acquiring, by the processor, an image through the camera in response to activating the camera; and storing the acquired image with the audio data in the memory.

6. The method of claim 1, further comprising:

acquiring a text corresponding to the at least one word; and storing the text with the audio data in the memory of the electronic device.

7. An electronic device comprising:

a display;

a memory; and a processor configured to:

display, on the display, an interface for recording audio data by the electronic device, while the audio data is being recorded, detect an input for acquiring at least one image associated with the audio data, wherein the input is at least one of a key input, a touch input, and a designated movement of the electronic device;

in response to detecting the input, identify a portion of the audio data, wherein the portion of the audio data is audio data which is recorded during a designated duration based on a time when the input is detected;

in response to identifying the portion of the audio data, acquire at least one word from the portion of the audio data;

in response to acquiring the at least one word, acquire the at least one image which is, based on the at least one word, searched for through an external electronic device; and in response to acquiring the at least one image, store the at least one image in association with the audio data in the memory, wherein the portion of the audio data is outputted when the at least one image is selected among a plurality of images.

8. The electronic device of claim 7, wherein the portion of the audio data includes audio data which corresponds to a sound, the sound being inputted to the electronic device for the designated duration before the time when the input is detected.

9. The electronic device of claim 7, wherein the at least one image includes an image associated with a meaning of the at least one word.

10. The electronic device of claim 7, wherein the at least one image includes an image associated with a subject which is obtained from the at least one word.

11. The electronic device of claim 7, wherein the processor is further configured to:
   in response to detecting the input, activate a camera of the electronic device while recording the audio data;
   acquire an image through the camera in response to activating the camera; and
   storing the acquired image with the audio data in the memory.

12. The electronic device of claim 7, wherein the processor is further configured to:
   acquire a text corresponding to the at least one word; and
   store the text with the audio data in the memory.

13. A non-transitory medium in an electronic device storing processor-executable instructions, which when executed by the processor cause the processor to:
   display, on a display of the electronic device, an interface for recording audio data by the electronic device;
   while the audio data is being recorded, detect, by the processor, an input for acquiring at least one image associated with the audio data, wherein the input is at least one of a key input, a touch input, and a designated movement of the electronic device;
   in response to detecting the input, identify, by the processor, a portion of the audio data, wherein the portion of the audio data is audio data which is recorded during a designated duration based on a time when the input is detected;
   in response to identifying the portion of the audio data, acquire, by the processor, at least one word from the portion of the audio data;
   in response to acquiring the at least one word, acquire, by the processor, the at least one image which is, based on the at least one word, searched for through an external electronic device; and
   in response to acquiring the at least one image, store the at least one image in association with the audio data in a memory of the electronic device, wherein the portion of the audio data is outputted when the at least one image is selected among a plurality of images.

\* \* \* \* \*